United States Patent
Becker et al.

(10) Patent No.: US 12,319,316 B2
(45) Date of Patent: Jun. 3, 2025

(54) SYSTEMS AND METHODS FOR AUTONOMOUS VEHICLE CONTROLS

(71) Applicant: Aurora Operations, Inc., Pittsburgh, PA (US)

(72) Inventors: Brian C. Becker, Pittsburgh, PA (US); Michael Lee Phillips, Pittsburgh, PA (US); Yang Xu, Pittsburgh, PA (US); Eric Michael Perko, Pittsburgh, PA (US); Narek Melik-Barkhudarov, Pittsburgh, PA (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 0 days.

(21) Appl. No.: 18/611,175

(22) Filed: Mar. 20, 2024

(65) Prior Publication Data

US 2024/0239377 A1    Jul. 18, 2024

Related U.S. Application Data

(63) Continuation of application No. 17/705,789, filed on Mar. 28, 2022, now Pat. No. 11,964,673, which is a
(Continued)

(51) Int. Cl.
*B60W 30/085*   (2012.01)
*B60W 60/00*    (2020.01)
(Continued)

(52) U.S. Cl.
CPC ...... *B60W 60/0018* (2020.02); *B60W 30/085* (2013.01); *G05D 1/0223* (2013.01);
(Continued)

(58) Field of Classification Search
CPC .......... B60W 60/0018; B60W 30/085; B60W 2554/4029; B60W 2554/4026;
(Continued)

(56) References Cited

U.S. PATENT DOCUMENTS 9,383,753 B1   7/2016   Templeton
9,442,905 B1   9/2016   Kawaguchi
(Continued)

FOREIGN PATENT DOCUMENTS

KR   20200144176 A   12/2020

*Primary Examiner* — Ashley L Redhead, Jr.
(74) *Attorney, Agent, or Firm* — Dority & Manning, P.A.

(57) ABSTRACT

Systems and methods for controlling autonomous vehicle are provided. A method can include obtaining, by a computing system, data indicative of a plurality of objects in a surrounding environment of the autonomous vehicle. The method can further include determining, by the computing system, one or more clusters of the objects based at least in part on the data indicative of the plurality of objects. The method can further include determining, by the computing system, whether to enter an operation mode having one or more limited operational capabilities based at least in part on one or more properties of the one or more clusters. In response to determining that the operation mode is to be entered by the autonomous vehicle, the method can include controlling, by the computing system, the operation of the autonomous vehicle based at least in part on the one or more limited operational capabilities.

20 Claims, 7 Drawing Sheets

Related U.S. Application Data continuation of application No. 16/707,529, filed on Dec. 9, 2019, now Pat. No. 11,315,431.

(60) Provisional application No. 62/912,847, filed on Oct. 9, 2019.

(51) Int. Cl.

| | | |
|---|---|---|
| *G05D 1/00* | (2006.01) | |
| *G05D 1/81* | (2024.01) | |
| *G06V 10/762* | (2022.01) | |
| *G06V 20/58* | (2022.01) | |
| *G06V 40/10* | (2022.01) | |
| *G08G 1/16* | (2006.01) | |

(52) U.S. Cl.
CPC .............. *G05D 1/81* (2024.01); *G06V 10/762* (2022.01); *G06V 20/58* (2022.01); *G06V 40/10* (2022.01); *G08G 1/166* (2013.01); *B60W 2554/4029* (2020.02)

(58) Field of Classification Search
CPC ......... B60W 2554/80; B60W 2720/10; B60W 60/0017; G05D 1/0223; G05D 1/81; G06V 10/762; G06V 20/58; G06V 40/10; G08G 1/166; G06F 18/23
See application file for complete search history.

(56) References Cited

U.S. PATENT DOCUMENTS

| | | | |
|---|---|---|---|
| 10,095,774 B1* | 10/2018 | Soceanu | G06N 20/00 |
| 10,296,812 B2* | 5/2019 | Dabeer | G06V 10/7625 |
| 10,558,217 B2* | 2/2020 | Jiang | G06F 18/217 |
| 10,816,972 B2* | 10/2020 | Michalakis | B60W 40/02 |
| 11,079,764 B2* | 8/2021 | Nister | G05D 1/0242 |
| 2018/0061230 A1 | 3/2018 | Madigan | |
| 2018/0061232 A1 | 3/2018 | Madigan | |
| 2018/0061237 A1 | 3/2018 | Erickson | |
| 2018/0173219 A1 | 6/2018 | Lee | |
| 2019/0103019 A1* | 4/2019 | Fowe | G08G 1/015 |
| 2019/0129432 A1* | 5/2019 | Russell | G06F 18/23 |
| 2019/0293782 A1 | 9/2019 | Suryanaryana | |
| 2020/0018606 A1 | 1/2020 | Wolcott | |
| 2020/0094829 A1 | 3/2020 | Ohmura | |
| 2020/0209864 A1 | 7/2020 | Chen | |
| 2020/0255030 A1* | 8/2020 | Yamamoto | G08G 1/166 |
| 2020/0271458 A1* | 8/2020 | Berry | G01C 21/34 |
| 2020/0294325 A1 | 9/2020 | Mueller-Lerwe | |
| 2020/0372285 A1* | 11/2020 | Adams | G06N 3/084 |
| 2020/0410853 A1 | 12/2020 | Akella | |
| 2021/0049901 A1 | 2/2021 | Young | |
| 2021/0096224 A1* | 4/2021 | Lee | G02B 19/0066 |
| 2021/0110716 A1* | 4/2021 | Becker | G06F 18/23 |

* cited by examiner

SYSTEMS AND METHODS FOR AUTONOMOUS VEHICLE CONTROLS

PRIORITY CLAIM

The present application is a continuation of U.S. application Ser. No. 17/705,789 having a filing date of Mar. 28, 2022, which is a continuation of U.S. application Ser. No. 16/707,529 having a filing date of Dec. 9, 2019 (now issued with U.S. Pat. No. 11,315,431 on Apr. 26, 2022), which is based on and claims benefit of U.S. Provisional Application 62/912,847 having a filing date of Oct. 9, 2019. Applicant claims priority to and the benefit of each of such applications and incorporates all such applications herein by reference in its entirety.

FIELD

The present disclosure relates generally to devices, systems, and methods for controlling autonomous vehicles.

BACKGROUND

An autonomous vehicle is a vehicle that is capable of sensing its environment and navigating with minimal or no human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path through such surrounding environment.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method to control the operation of an autonomous vehicle. The computer-implemented method can include obtaining, by a computing system comprising one or more computing devices, data indicative of a plurality of objects in a surrounding environment of the autonomous vehicle. The computer-implemented method can further include determining, by the computing system, one or more clusters of the objects based at least in part on the data indicative of the plurality of objects. The computer-implemented method can further include determining, by the computing system, whether to enter an operation mode having one or more limited operational capabilities based at least in part on one or more properties of the one or more clusters. In response to determining that the operation mode is to be entered by the autonomous vehicle, the computer-implemented method can further include controlling, by the computing system, the operation of the autonomous vehicle based at least in part on the one or more limited operational capabilities.

Another example aspect of the present disclosure is directed a computing system. The computing system can include a vehicle autonomy system comprising one or more processors. The vehicle autonomy system can be configured to: perceive one or more objects in a surrounding environment of the autonomous vehicle; predict a trajectory for each of the one or more objects in the surrounding environment; and plan a route of travel for the autonomous vehicle based at least in part on the predicted trajectory for each of the one or more objects. The computing system can further include a caution mode system comprising one or more processors. The caution mode system can be configured to obtain, from the vehicle autonomy system, data indicative of a risk of operating the autonomous vehicle in the surrounding environment. The caution mode system can be further configured to determine, based at least in part on the data indicative of the risk of operating the autonomous vehicle in the surrounding environment, that the autonomous vehicle should enter into a caution mode. In response to determining that the vehicle should enter into the caution mode, the caution mode system can be further configured to determine a limited set of operational capabilities of the autonomous vehicle. The limited set of the operational capabilities of the autonomous vehicle can include a vehicle speed restriction, a right turn on red restriction, or an unprotected left turn restriction.

Another example aspect of the present disclosure is directed to an autonomous vehicle. The autonomous vehicle can include one or more processors and one or more tangible, non-transitory, computer readable media that collectively store instructions that when executed by the one or more processors cause the computing system to perform operations. The operations can include obtaining data indicative of a plurality of pedestrians or bicyclists in a surrounding environment of the autonomous vehicle. The operations can further include determining one or more clusters of the pedestrians or bicyclists based at least in part on the data indicative of the plurality of pedestrians or bicyclists. The operations can further include determining that a total number of pedestrians or bicyclists in at least one of the one or more clusters exceeds a threshold number. The operations can further include determining that an area of the at least one cluster exceeds a threshold area. The operations can further include determining that a distance between a hull of the at least one cluster and a planned route of travel of the autonomous vehicle is less than a threshold distance. The operations can further include controlling the autonomous vehicle to a speed at or below a vehicle speed restriction.

Other aspects of the present disclosure are directed to various systems, apparatuses, non-transitory computer-readable media, vehicles, and computing devices.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
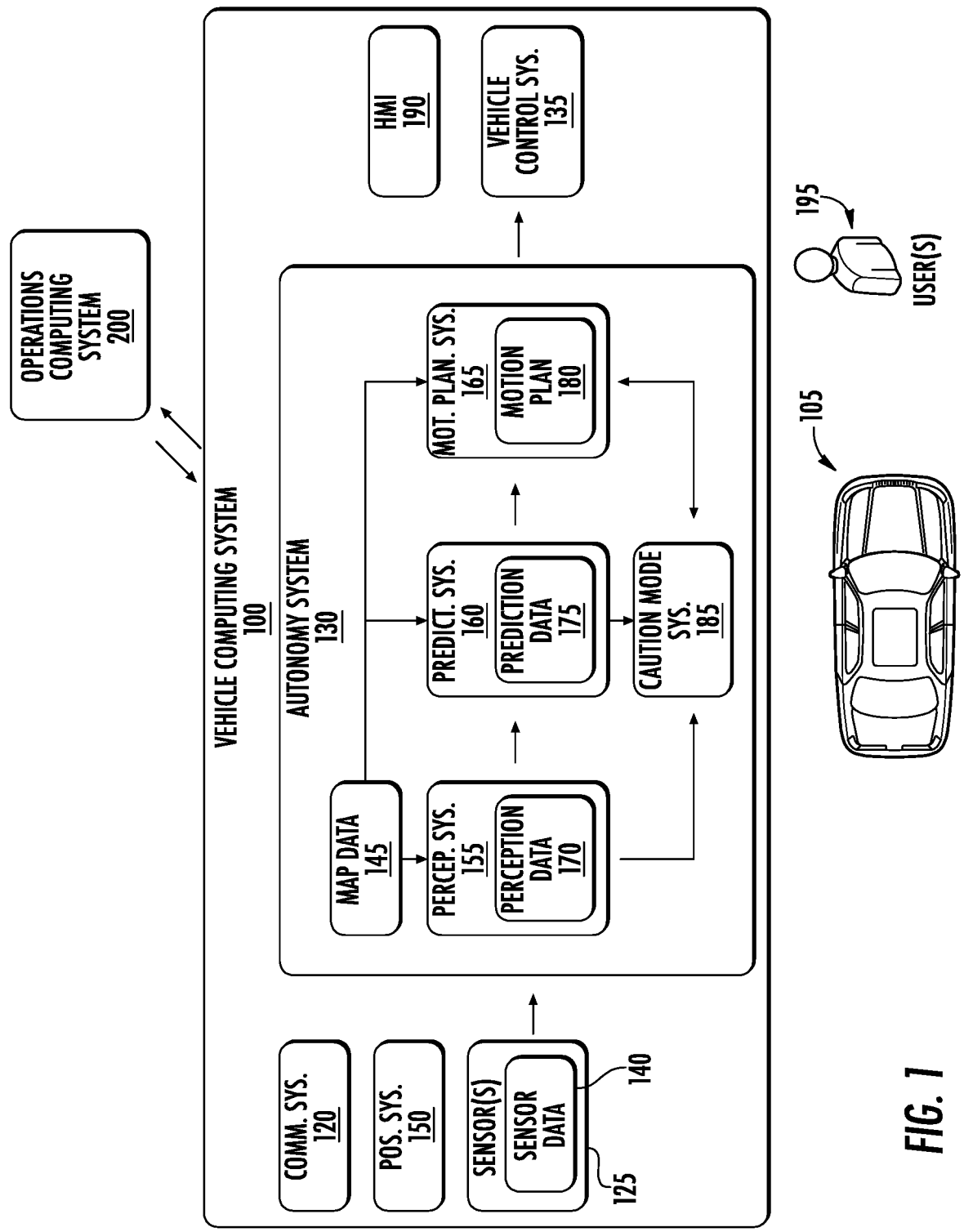
FIG. 1 depicts a block diagram of an example autonomous vehicle computing system according to example aspects of the present disclosure.

Example aspects of the present disclosure are directed to improved techniques for motion planning for an autonomous vehicle in computationally-intensive and/or increased risk operating environments. An autonomous vehicle can drive, navigate, operate, etc. with minimal and/or no interaction from a human driver to provide a vehicle service. By way of example, an autonomous vehicle can be configured to provide transportation and/or other services, such as transporting a passenger from a first location to a second location. The autonomous vehicle can include a plurality of sensors to perceive and navigate through the surrounding environment. For example, sensor data from one or more sensors can be analyzed by a computing system to detect objects within the surrounding environment, such as via a perception system. A predicted motion (e.g., a trajectory) of the objects in the surrounding environment can then be determined by the computing system, such as via a prediction system. A motion plan for the autonomous vehicle can then be determined for the autonomous vehicle in response to the predicted trajectories of the objects, such as by a motion planning system. However, in some operating environments, perceiving a plurality of objects, predicting a corresponding trajectory for each object, and determining a motion plan in response to the projected trajectories of the objects can be very computationally-intensive. For example, an autonomous vehicle operating near a crowd of hundreds of pedestrians and/or bicyclists may require significant computational resources to perceive, predict (e.g., track), and plan a motion path in response to the hundreds of pedestrians and/or bicyclists.

The systems and methods of the present disclosure can allow for an autonomous vehicle to enter a caution mode with one or more limited operational capabilities in order to improve the ability of the autonomous vehicle to navigate in such an environment. For example, in some implementations, a computing system can obtain data indicative of a plurality of pedestrians or bicyclists in a surrounding environment of the autonomous vehicle. The computing system can determine one or more clusters of pedestrians or bicyclists based at least in part on the data indicative of the plurality of pedestrians or bicyclists. For example, in some implementations, pedestrians in close proximity to one another can be clustered together. The computing system can determine whether to enter an operation mode having one or more limited operational capabilities based at least in part on one or more properties of the one or more clusters. For example, in some implementations, a reduced vehicle speed threshold can be implemented when a cluster of pedestrians is in close proximity to a planned path of travel of the autonomous vehicle. In response to determining that the autonomous vehicle should enter the operation mode, the computing system can control the operation of the autonomous vehicle based at least in part on the one or more limited operational capabilities. For example, in some implementations, the computing system can reduce the speed of the autonomous vehicle to below the reduced vehicle speed threshold. The reduced speed of the autonomous vehicle can allow for an increased amount of time (e.g., an increased reaction time) to plan in response to the plurality of pedestrians.

More particularly, an autonomous vehicle (e.g., ground-based vehicle, etc.) can include various systems and devices configured to control the operation of the vehicle. For example, an autonomous vehicle can include an onboard vehicle computing system (e.g., located on or within the autonomous vehicle) that is configured to operate the autonomous vehicle. The vehicle computing system can obtain sensor data from sensor(s) onboard the vehicle (e.g., cameras, LIDAR, RADAR, etc.), attempt to comprehend the vehicle's surrounding environment by performing various processing techniques on the sensor data, and generate an appropriate motion plan through the vehicle's surrounding environment. Moreover, an autonomous vehicle can include a communications system that can allow the vehicle to communicate with a computing system that is remote from the vehicle such as, for example, that of a service entity.

For example, one or more sensors of the autonomous vehicle can obtain sensor data associated with objects (e.g., pedestrians, bicycles, automobiles, etc.) within the surrounding environment of the autonomous vehicle. In some implementations, the perception system can receive the sensor data and generate state data indicative of the one or more objects, such as data describing the position, velocity, heading, acceleration, yaw rate, size, type, distance from the autonomous vehicle, etc. for each object. In some implementations, a prediction system can create prediction data associated with each respective object within the surrounding environment, which can be indicative of one or more predicted future locations and/or trajectories of each respective object. In some implementations, a motion planning system can determine a motion plan for the autonomous vehicle based on the predicted locations and/or trajectories for the objects. For example, the motion planning system can determine the motion plan for the autonomous vehicle to navigate around and/or in response to the perceived objects and their predicted trajectories.

In some operating environments, however, perceiving and tracking each individual object may be particularly computationally-intensive, and operating in some environments may be riskier than operating in others. For example, an autonomous vehicle picking up a passenger outside of a stadium may be surrounded by hundreds or even thousands of pedestrians, bicyclists, automobiles, and/or other objects. Moreover, some objects (e.g., a pedestrian far away from the autonomous vehicle) may be obscured by other objects (e.g., pedestrians closer to the vehicle), further complicating the task of perceiving and tracking objects in the surrounding environment.

The systems and methods of the present disclosure, however, can recognize such difficult operating environments, and control the operation of the autonomous vehicle accordingly. For example, in some implementations, data indicative of a plurality of pedestrians and/or bicyclists in the surrounding environment of the autonomous vehicle can be obtained by a computing system. For example, perception data can be obtained from a perception system of an autonomy computing system. The perception data can include, for example, state data indicative of the pedestrians and/or bicyclists, such as a position, object type, velocity, acceleration, heading, etc. The computing system can then determine one or more clusters of the pedestrians or bicyclists based at least in part on the data indicative of the plurality of pedestrians or bicyclists. For example, pedestrians and/or bicyclists located in close proximity to one another can be clustered together. In various implementations, one or more clustering algorithms can be used to cluster the plurality of pedestrians and/or bicyclists, such as, for example, grouping pedestrians which are less than a threshold distance from one another into a cluster. In some implementations, at least a subset of the plurality of pedestrians or bicyclists can be grouped into each of the one or more clusters, and a hull around each of the one or more clusters can be determined. For example, the hull can be indicative of an outer boundary of the cluster (e.g., a polygon encapsulating the cluster).

The computing system can then determine whether to enter an operation mode having one or more limited operational capabilities of the autonomous vehicle based at least in part on one or more properties of the one or more clusters. For example, in some implementations, if the number of pedestrians and/or bicyclists in a cluster exceeds a threshold number, the computing system can perform additional analysis on the cluster. If, however, the number of pedestrians and/or bicyclists in the cluster is less than the threshold number, the computing system can continue to operate the autonomous vehicle without limiting an operational capability of the autonomous vehicle.

In some implementations, if the area of the cluster is greater than a threshold area, the computing system can perform additional analysis on the cluster. For example, the area of the cluster can be determined based on the hull of the cluster, and the area can be compared to a threshold area. If, however, the area of the cluster is less than the threshold area, the computing system can continue to operate the autonomous vehicle without limiting an operational capability of the autonomous vehicle.

In some implementations, the computing system can determine whether the distance between the hull of a cluster and a planned route of travel of the autonomous vehicle is less than a threshold distance. For example, the computing system can plot a cluster in relation to the planned route of travel determined from a motion plan. The computing system can then determine a distance from the cluster to the planned route of travel. If the distance from the cluster to the planned route of travel is less than a threshold distance, the computing system can determine that the autonomous vehicle should enter the operation mode with the limited operational capability wherein the limited operational capability is a vehicle speed restriction. For example, the vehicle speed restriction can be a reduced speed threshold, such as a maximum vehicle speed of 10 mph. In some implementations, a plurality of distance thresholds and corresponding vehicle speed restrictions can be used. For example, in some implementations, as the distance between the planned route of travel and the cluster decreases, the corresponding vehicle speed restriction can be reduced.

The computing system can further control the operation of the autonomous vehicle based at least in part on the one or more limited operational capabilities. For example, the computing system can control the autonomous vehicle to a speed at or below the vehicle speed restriction. In some implementations, the computing system can control the autonomous vehicle subject to a jerk-limited deceleration rate. For example, the autonomous vehicle can be transitioned to a speed at or below the vehicle speed restriction by braking or otherwise decelerating the vehicle over a period of time such that the jerk (e.g., change in acceleration) is less than a threshold amount.

In some implementations, the computing system can control operation of the autonomous vehicle based at least in part on the one or more limited operational capabilities by publishing the vehicle speed restriction to the motion planning system of the autonomous vehicle. For example, the motion planning system can use the vehicle speed restriction to determine an updated motion plan for the vehicle, and one or more vehicle controllers can control the autonomous vehicle according to the updated motion plan.

In some implementations, while operating subject to the vehicle speed restriction, the autonomous vehicle can prune one or more objects from a motion planning analysis. For example, while travelling at a reduced speed, the autonomous vehicle will travel a shorter distance over a fixed period of time than would be travelled at an increased speed. Accordingly, the number of objects (e.g., stationary or moving) with which the autonomous vehicle could interact over the fixed period is likewise reduced. According to example aspects of the present disclosure, objects which are positioned at a distance greater than a threshold distance can be pruned from a set of objects to be analyzed by the computing system. For example, objects which are located far away (e.g., beyond a threshold distance) from the autonomous vehicle can be pruned from a prediction analysis and/or motion planning analysis. In this way, the computational resources required to operate an autonomous vehicle can be reduced.

In some implementations, other limited operational capabilities can be used. For example, a right turn on red restriction can be used to prevent the autonomous vehicle from making a right turn at an intersection when the autonomous vehicle is stopped at a red light. In some implementations, an unprotected left turn restriction can be used to prevent the autonomous vehicle from making and unprotected left turn (e.g., a left turn on a green light but not a green turn arrow). These limited operational capabilities can be used, for example, to reduce the complexity of implementing a motion plan by pruning the number of possible actions the autonomous vehicle can take, and therefore the number of possible objects and/or the complexity of those objects' possible actions which must be analyzed.

In some implementations, the computing system can further be configured to determine whether the autonomous vehicle has traveled past a cluster by at least a threshold distance. For example, the computing system can track the cluster as the autonomous vehicle travels along the planned route of travel. Once the autonomous vehicle has travelled past the cluster by a threshold distance, the vehicle speed restriction can be removed. For example, the autonomous vehicle can be allowed to accelerate to a new speed threshold that is higher than the vehicle speed restriction. In some implementations, the autonomous vehicle can similarly be transitioned to an increased speed subject to a jerk-limited acceleration rate.

In some implementations, a machine-learned model can be used to determine the one or more limited operational capabilities of the autonomous vehicle based at least in part on one or more properties of the one or more clusters. For example, the data indicative of the plurality of objects (e.g., perception data) can be input into a machine-learned model to determine whether and when to limit the operational capabilities of the autonomous vehicle. The machine-learned model can be configured to analyze the perception data and determine whether to, for example, reduce the speed of the autonomous vehicle, restrict right turns on red, and/or restrict unprotected left turns.

In some implementations, the machine-learned model can be trained based at least in part on training data comprising one or more annotated driving logs from one or more human operator driving sessions. For example, a human operator can operate an autonomous vehicle, such as in a manual mode, and sensor data can be obtained during the operator driving session. As the human operator slows down, such as in response to driving in an area heavily populated by pedestrians or bicycles, the human operator can annotate the driver log with an annotation indicating the presence of the crowds of people and/or bicycles. The machine-learned model can then be trained using the annotated driving logs to recognize situations in which crowds of people and/or bicycles are present, and in response, limit the operational capability of the autonomous vehicle, such as by slowing the autonomous vehicle down.

In some implementations, the computer implemented method to control the operation of autonomous vehicle in a computationally-intensive or increased risk operating environment can be performed by a caution mode system. For example, a computing system (e.g., a vehicle autonomy computing system) can include a caution mode system. In some implementations, the caution mode system can be configured to obtain data indicative of a risk of operating the autonomous vehicle in the surrounding environment. The caution mode system can determine that the autonomous vehicle should enter into a caution mode based at least in part on the data indicative of the risk of operating the autonomous vehicle in the surrounding environment. In response to determining that the vehicle should enter into the caution mode, the caution mode system can limit an operational capability of the autonomous vehicle. For example, the limited operational capability can include a vehicle speed restriction, a right turn on red restriction, and/or an unprotected left turn restriction.

In some implementations, the data indicative of the risk of operating the autonomous vehicle in the surrounding environment can include data indicative of a total number of objects perceived by the vehicle autonomy system. For example, when the total number of objects perceived by the vehicle autonomy system exceeds a threshold, the caution mode system can determine that the autonomous vehicle should enter into the caution mode.

In some implementations, the data indicative of the risk of operating the autonomous vehicle in the surrounding environment can include data indicative of the vehicle autonomy system's ability to perform one or more functions. For example, the vehicle autonomy system can be configured to perform various functions within a threshold time period (e.g., 100 ms). As examples, each of the sensor data collection, perception, prediction, and motion planning functions can each be consecutively performed, with each function allocated the same amount of time for the analysis to be performed. If, however, any function is unable to be performed within the threshold time period (e.g., the prediction function is unable to predict a trajectory for each perceived object within the allocated time period), then the caution mode system can determine that the autonomous vehicle should enter into the caution mode.

In some implementations, the data indicative of the risk of operating the autonomous vehicle in the surrounding environment can include data indicative of a discrepancy between two or more subsystems of the vehicle autonomy system. For example, in some implementations, the vehicle autonomy system can include two subsystems (e.g., perception systems) which are both configured to perform the same function, such as classifying objects and/or determining state information about objects. If there is a discrepancy between the two systems that exceeds a threshold, such as a discrepancy (e.g., disagreement) about an object's velocity, then the caution mode system can determine that the autonomous vehicle should enter into the caution mode.

Similarly, in some implementations, two separate systems may have a discrepancy that exceeds a threshold. For example, a prediction system may predict that an object will travel along a particular trajectory, while a perception system may track the object and determine that the object actually traveled in a very different trajectory. In such a situation, the discrepancy between the predicted trajectory and the actual trajectory may exceed a threshold, and the caution mode system may determine that the autonomous vehicle should enter into the caution mode.

In some implementations, the data indicative of the risk of operating the autonomous vehicle in the surrounding environment can include perception data and/or prediction data of one or more objects in the surrounding environment. Further, a machine-learned model can be configured to determine that the autonomous vehicle should enter into the caution mode by analyzing the perception data or the prediction data. For example, the machine-learned model can analyze perception and/or prediction data indicative of a plurality of pedestrians or bicyclists in a cluster in close proximity to a planned path of travel of the autonomous vehicle, and in response, determine that the autonomous vehicle should enter into the caution mode.

The systems and methods of the present disclosure can provide any number of technical effects and benefits. More particularly, the systems and methods of the present disclosure provide improved techniques for operating an autonomous vehicle in computationally-intensive operating and/or increased risk environments, such as situations which present elevated operational risks. For example, as described herein, a caution mode system can obtain data indicative of a risk of operating an autonomous vehicle in a surrounding environment. For example, the data indicative of the risk can include data indicative of a large number of perceived objects, data indicative of one or more clusters of pedestrians and/or bicycles, data indicative of the vehicle autonomy system's ability to perform one or more functions, data indicative of a discrepancy between two or more subsystems, and/or perception or prediction data analyzed by a machine-learned model. The caution mode system can determine that the autonomous vehicle should enter into the caution mode, and in response, limit an operational capability of the autonomous vehicle. For example, the caution mode system can implement a vehicle speed restriction, a right turn on red restriction, and/or an unprotected left turn restriction.

In turn, the systems and methods described herein can improve the safety of autonomous vehicle operation. For example, by identifying situations which present an elevated risk and/or situations which require significant computational resources, the systems and methods of the present disclosure can allow for such risks to be mitigated and/or computational resources to be preserved. For example, when an object in the surrounding environment of an autonomous vehicle behaves in an unanticipated way (e.g., a discrepancy between a predicted movement and a perceived movement of the object occurs), the speed of the vehicle can be reduced, which can allow for an increased amount of time for the autonomous vehicle to react to the object.

The systems and methods of the present disclosure can further allow for computational resources of an autonomous vehicle to be preserved. For example, by pruning distant objects from a prediction and motion planning analysis while operating the autonomous vehicle at a reduced speed, fewer computational resources may be required to autonomously operate the autonomous vehicle. In turn, this allows for more efficient use of computational resources onboard an autonomous vehicle.

Example aspects of the present disclosure can provide an improvement to vehicle computing technology such as autonomous vehicle computing technology. For example, the systems and methods of the present disclosure provide an improved approach to controlling the operation of an autonomous vehicle in a computationally-intensive operating environment. For example, a computing system (e.g., a computing system onboard an autonomous vehicle) can obtain data indicative of a plurality of objects in a surrounding environment of the autonomous vehicle. The computing system can determine one or more clusters of the pedestrians or bicyclists based at least in part on the data indicative of the plurality of pedestrians or bicyclists. For example, in some implementations, the computing system can group pedestrians and/or bicyclists in close proximity to one another in a cluster, and can determine a hull around the cluster. The computing system can then determine whether to enter an operation mode having one or more limited operational capabilities based at least in part on one or more properties of the one or more clusters. For example, in some implementations, the computing system can determine that a total number of pedestrians or bicyclists in at least one of the one or more clusters exceeds a threshold number, that an area of the at least one cluster exceeds a threshold area, and that a distance between the hull of the at least one cluster and a planned route of travel of the autonomous vehicle is less than a threshold distance. Limited operational capabilities can include a vehicle speed restriction, a right turn on red restriction, and/or an unprotected left turn restriction. In response to determining that the autonomous vehicle should enter the operation mode, the computing system can control the operation of the autonomous vehicle based at least in part on the one or more limited operational capabilities. For example, the computing system can control the autonomous vehicle to a speed at or below a vehicle speed restriction.

With reference now to the FIGS., example aspects of the present disclosure will be discussed in further detail. FIG. 1 illustrates an example vehicle computing system 100 according to example aspects of the present disclosure. The vehicle computing system 100 can be associated with an autonomous vehicle 105. The vehicle computing system 100 can be located onboard (e.g., included on and/or within) the autonomous vehicle 105.

The autonomous vehicle 105 incorporating the vehicle computing system 100 can be various types of vehicles. For instance, the autonomous vehicle 105 can be a ground-based autonomous vehicle such as an autonomous car, autonomous truck, autonomous bus, autonomous bike, autonomous scooter, autonomous light electric vehicle (LEV), etc. The autonomous vehicle 105 can be an air-based autonomous vehicle (e.g., airplane, helicopter, or other aircraft) or other types of vehicles (e.g., watercraft, etc.). The autonomous vehicle 105 can drive, navigate, operate, etc. with minimal and/or no interaction from a human operator (e.g., driver). In some implementations, a human operator can be omitted from the autonomous vehicle 105 (and/or also omitted from remote control of the autonomous vehicle 105). In some implementations, a human operator can be included in the autonomous vehicle 105.

In some implementations, the autonomous vehicle 105 can be configured to operate in a plurality of operating modes. The autonomous vehicle 105 can be configured to operate in a fully autonomous (e.g., self-driving) operating mode in which the autonomous vehicle 105 is controllable without user input (e.g., can drive and navigate with no input from a human operator present in the autonomous vehicle 105 and/or remote from the autonomous vehicle 105). The autonomous vehicle 105 can operate in a semi-autonomous operating mode in which the autonomous vehicle 105 can operate with some input from a human operator present in the autonomous vehicle 105 (and/or a human operator that is remote from the autonomous vehicle 105). The autonomous vehicle 105 can enter into a manual operating mode in which the autonomous vehicle 105 is fully controllable by a human operator (e.g., human driver, pilot, etc.) and can be prohibited and/or disabled (e.g., temporary, permanently, etc.) from performing autonomous navigation (e.g., autonomous driving). In some implementations, the autonomous vehicle 105 can implement vehicle operating assistance technology (e.g., collision mitigation system, power assist steering, etc.) while in the manual operating mode to help assist the human operator of the autonomous vehicle 105.

The operating modes of the autonomous vehicle 105 can be stored in a memory onboard the autonomous vehicle 105. For example, the operating modes can be defined by an operating mode data structure (e.g., rule, list, table, etc.) that indicates one or more operating parameters for the autonomous vehicle 105, while in the particular operating mode. For example, an operating mode data structure can indicate that the autonomous vehicle 105 is to autonomously plan its motion when in the fully autonomous operating mode. The vehicle computing system 100 can access the memory when implementing an operating mode.

The operating mode of the autonomous vehicle 105 can be adjusted in a variety of manners. For example, the operating mode of the autonomous vehicle 105 can be selected remotely, off-board the autonomous vehicle 105. For example, a remote computing system (e.g., of a vehicle provider and/or service entity associated with the autonomous vehicle 105) can communicate data to the autonomous vehicle 105 instructing the autonomous vehicle 105 to enter into, exit from, maintain, etc. an operating mode. By way of example, such data can instruct the autonomous vehicle 105 to enter into the fully autonomous operating mode. In some implementations, the operating mode of the autonomous vehicle 105 can be set onboard and/or near the autonomous vehicle 105. For example, the vehicle computing system 100 can automatically determine when and where the autonomous vehicle 105 is to enter, change, maintain, etc. a particular operating mode (e.g., without user input). Additionally, or alternatively, the operating mode of the autonomous vehicle 105 can be manually selected via one or more interfaces located onboard the autonomous vehicle 105 (e.g., key switch, button, etc.) and/or associated with a computing device proximate to the autonomous vehicle 105 (e.g., a tablet operated by authorized personnel located near the autonomous vehicle 105). In some implementations, the operating mode of the autonomous vehicle 105 can be adjusted by manipulating a series of interfaces in a particular order to cause the autonomous vehicle 105 to enter into a particular operating mode.

The vehicle computing system 100 can include one or more computing devices located onboard the autonomous vehicle 105. For example, the computing device(s) can be located on and/or within the autonomous vehicle 105. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the autonomous vehicle 105 (e.g., its computing system, one or more processors, etc.) to perform operations and functions, such as those described herein for determining sensor degradation conditions and implementing sensor corrective actions, etc.

The autonomous vehicle 105 can include a communications system 120 configured to allow the vehicle computing system 100 (and its computing device(s)) to communicate with other computing devices. The vehicle computing system 100 can use the communications system 120 to communicate with one or more computing device(s) that are remote from the autonomous vehicle 105 over one or more networks (e.g., via one or more wireless signal connections). For example, the communications system 120 can allow the autonomous vehicle to communicate and receive data from an operations computing system 200 of a service entity. In some implementations, the communications system 120 can allow communication among one or more of the system(s) on-board the autonomous vehicle 105. The communications system 120 can include any suitable components for interfacing with one or more network(s), including, for example, transmitters, receivers, ports, controllers, antennas, and/or other suitable components that can help facilitate communication.

As shown in FIG. 1, the autonomous vehicle 105 can include one or more vehicle sensors 125, an autonomy computing system 130, one or more vehicle control systems 135, and other systems, as described herein. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can send and/or receive data, messages, signals, etc. amongst one another via the communication channel.

The vehicle sensor(s) 125 can be configured to acquire sensor data 140. This can include sensor data associated with the surrounding environment of the autonomous vehicle 105. For instance, the sensor data 140 can acquire image and/or other data within a field of view of one or more of the vehicle sensor(s) 125. The vehicle sensor(s) 125 can include a Light Detection and Ranging (LIDAR) system, a Radio Detection and Ranging (RADAR) system, one or more cameras (e.g., visible spectrum cameras, infrared cameras, etc.), ultrasonic sensors, wheel encoders, steering angle encoders, positioning sensors (e.g., GPS sensors), inertial measurement units, motion sensors, and/or other types of imaging capture devices and/or sensors. The sensor data 140 can include image data, RADAR data, LIDAR data, and/or other data acquired by the vehicle sensor(s) 125. The autonomous vehicle 105 can include other sensors configured to acquire data associated with the autonomous vehicle 105. For example, the autonomous vehicle 105 can include inertial measurement unit(s), and/or other sensors.

In some implementations, the sensor data 140 can be indicative of one or more objects within the surrounding environment of the autonomous vehicle 105. The object(s) can include, for example, vehicles, pedestrians, bicycles, and/or other objects. The object(s) can be located in front of, to the rear of, to the side of the autonomous vehicle 105, etc. The sensor data 140 can be indicative of locations associated with the object(s) within the surrounding environment of the autonomous vehicle 105 at one or more times. The vehicle sensor(s) 125 can communicate (e.g., transmit, send, make available, etc.) the sensor data 140 to the autonomy computing system 130.

In addition to the sensor data 140, the autonomy computing system 130 can retrieve or otherwise obtain map data 145. The map data 145 can provide information about the surrounding environment of the autonomous vehicle 105. In some implementations, an autonomous vehicle 105 can obtain detailed map data that provides information regarding: the identity and location of different roadways, road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); the location of obstructions (e.g., roadwork, accidents, etc.); data indicative of events (e.g., scheduled concerts, parades, etc.); and/or any other map data that provides information that assists the autonomous vehicle 105 in comprehending and perceiving its surrounding environment and its relationship thereto. In some implementations, the vehicle computing system 100 can determine a vehicle route for the autonomous vehicle 105 based at least in part on the map data 145.

The autonomous vehicle 105 can include a positioning system 150. The positioning system 150 can determine a current position of the autonomous vehicle 105. The positioning system 150 can be any device or circuitry for analyzing the position of the autonomous vehicle 105. For example, the positioning system 150 can determine position by using one or more of inertial sensors (e.g., inertial measurement unit(s), etc.), a satellite positioning system, based on IP address, by using triangulation and/or proximity to network access points or other network components (e.g., cellular towers, WiFi access points, etc.) and/or other suitable techniques. The position of the autonomous vehicle 105 can be used by various systems of the vehicle computing system 100 and/or provided to a remote computing system. For example, the map data 145 can provide the autonomous vehicle 105 relative positions of the elements of a surrounding environment of the autonomous vehicle 105. The autonomous vehicle 105 can identify its position within the surrounding environment (e.g., across six axes, etc.) based at least in part on the map data 145. For example, the vehicle computing system 100 can process the sensor data 140 (e.g., LIDAR data, camera data, etc.) to match it to a map of the surrounding environment to get an understanding of the vehicle's position within that environment.

The autonomy computing system 130 can include a perception system 155, a prediction system 160, a motion planning system 165, a caution mode system 185, and/or other systems that cooperate to perceive the surrounding environment of the autonomous vehicle 105 and determine a motion plan 180 for controlling the motion of the autonomous vehicle 105 accordingly. For example, the autonomy computing system 130 can obtain the sensor data 140 from the vehicle sensor(s) 125, process the sensor data 140 (and/or other data) to perceive its surrounding environment, predict the motion of objects within the surrounding environment, and generate an appropriate motion plan 180 through such surrounding environment. The autonomy computing system 130 can communicate with the one or more vehicle control systems 135 to operate the autonomous vehicle 105 according to the motion plan 180.

The vehicle computing system 100 (e.g., the autonomy computing system 130) can identify one or more objects that are proximate to the autonomous vehicle 105 based at least in part on the sensor data 140 and/or the map data 145. For example, the vehicle computing system 100 (e.g., the perception system 155) can process the sensor data 140, the map data 145, etc. to obtain perception data 170. The vehicle computing system 100 can generate perception data 170 that is indicative of one or more states (e.g., current and/or past state(s)) of a plurality of objects that are within a surrounding environment of the autonomous vehicle 105. For example, the perception data 170 for each object can describe (e.g., for a given time, time period) an estimate of the object's: current and/or past location (also referred to as position); current and/or past speed/velocity; current and/or past acceleration; current and/or past heading; current and/or past orientation; a shape; a size/footprint (e.g., as represented by a bounding shape); a type/class (e.g., pedestrian class vs. vehicle class vs. bicycle class), a distance from the autonomous vehicle 105; the uncertainties associated therewith, and/or other state information. The perception system 155 can provide the perception data 170 to the prediction system 160, the caution mode system 185, and/or the motion planning system 165.

The prediction system 160 can be configured to predict a motion of the object(s) within the surrounding environment of the autonomous vehicle 105. For instance, the prediction system 160 can generate prediction data 175 associated with such object(s). The prediction data 175 can be indicative of one or more predicted future locations of each respective object. For example, the prediction system 160 can determine a predicted motion trajectory along which a respective object is predicted to travel over time. A predicted motion trajectory can be indicative of a path that the object is predicted to traverse and an associated timing with which the object is predicted to travel along the path. The predicted path can include and/or be made up of a plurality of way points. In some implementations, the prediction data 175 can be indicative of the speed and/or acceleration at which the respective object is predicted to travel along its associated predicted motion trajectory. The prediction system 160 can output the prediction data 175 (e.g., indicative of one or more of the predicted motion trajectories) to the motion planning system 165 and/or the caution mode system 185.

The vehicle computing system 100 (e.g., the motion planning system 165) can determine a motion plan 180 for the autonomous vehicle 105 based at least in part on the perception data 170, the prediction data 175, and/or other data. A motion plan 180 can include vehicle actions (e.g., planned vehicle trajectories, speed(s), acceleration(s), other actions, etc.) with respect to one or more of the objects within the surrounding environment of the autonomous vehicle 105 as well as the objects' predicted movements. For instance, the motion planning system 165 can implement an optimization algorithm, model, etc. that considers cost data associated with a vehicle action as well as other objective functions (e.g., cost functions based on speed limits, traffic lights, etc.), if any, to determine optimized variables that make up the motion plan 180. The motion planning system 165 can determine that the autonomous vehicle 105 can perform a certain action (e.g., pass an object, etc.) without increasing the potential risk to the autonomous vehicle 105 and/or violating any traffic laws (e.g., speed limits, lane boundaries, signage, etc.). For instance, the motion planning system 165 can evaluate one or more of the predicted motion trajectories of one or more objects during its cost data analysis as it determines an optimized vehicle trajectory through the surrounding environment. The motion planning system 165 can generate cost data associated with such trajectories. In some implementations, one or more of the predicted motion trajectories may not ultimately change the motion of the autonomous vehicle 105 (e.g., due to an overriding factor). In some implementations, the motion plan 180 may define the vehicle's motion such that the autonomous vehicle 105 avoids the object(s), reduces speed to give more leeway to one or more of the object(s), proceeds cautiously, performs a stopping action, etc.

The motion planning system 165 can be configured to continuously update the vehicle's motion plan 180 and a corresponding planned vehicle motion trajectory. For example, in some implementations, the motion planning system 165 can generate new motion plan(s) 180 for the autonomous vehicle 105 (e.g., multiple times per second). Each new motion plan 180 can describe a motion of the autonomous vehicle 105 over the next planning period (e.g., next several seconds). Moreover, a new motion plan 180 may include a new planned vehicle motion trajectory. Thus, in some implementations, the motion planning system 165 can continuously operate to revise or otherwise generate a short-term motion plan based on the currently available data. Once the optimization planner has identified the optimal motion plan 180 (or some other iterative break occurs), the optimal motion plan 180 (and the planned motion trajectory) can be selected and executed by the autonomous vehicle 105.

The caution mode system 185 can be configured to determine if and when to enter an operation mode having one or more limited operational capabilities (e.g., a "caution mode"). For example, in some implementations, the caution mode system 185 can obtain data indicative of a risk of operating the autonomous vehicle 105 in the surrounding environment. The data indicative of the risk of operating the autonomous vehicle 105 in the surrounding environment can come from the vehicle autonomy system 130. For example, in some implementations, caution mode system 185 can obtain the data indicative of the risk by obtaining perception data 170, prediction data 175, and/or motion plan data 180 from the vehicle autonomy system 130.

The caution mode system 185 can then determine to enter the caution mode based at least in part on the data indicative of the risk of operating the autonomous vehicle 105 in the surrounding environment. Further, in response to determining that the vehicle should enter into the caution mode, the caution mode system 185 can determine a limited set of operational capabilities of the autonomous vehicle. For example, in some implementations, the limited set of operational capabilities of the autonomous vehicle can include one or more of a vehicle speed restriction, a right turn on red restriction, or an unprotected left turn restriction. The caution mode system 185 can then control the operation of the autonomous vehicle 105 based at least in part on the one or more limited operational capabilities.

For example, a right turn on red restriction can be used to prevent the autonomous vehicle 105 from making a right turn at an intersection when the autonomous vehicle is stopped at a red light. In some implementations, an unprotected left turn restriction can be used to prevent the autonomous vehicle 105 from making and unprotected left turn (e.g., a left turn on a green light but not a green turn arrow). These limited operational capabilities can be used, for example, to reduce the complexity of determining and implementing a motion plan 180 by pruning the number of possible actions the autonomous vehicle 105 can take, and therefore the number of possible objects and/or the complexity of those objects' possible actions which must be analyzed.

For example, in some implementations, the caution mode system 185 can obtain data indicative of a plurality of objects in a surrounding environment of the autonomous vehicle 105. For example, the data indicative of a plurality of objects can include perception data 170 obtained from the perception system 155. The perception data 155 can include, for example, state data indicative of the pedestrians and/or bicyclists, such as a position, object type, velocity, acceleration, heading, etc.

In some implementations, the data indicative of a plurality of objects can include data indicative of a plurality of pedestrians and/or bicyclists. The caution mode system 185 can then determine one or more clusters of pedestrians and/or bicyclists based at least in part on the data indicative of the plurality of pedestrians and/or bicyclists. For example, the caution mode system 185 can determine that pedestrians and/or bicyclists located in close proximity to one another can be clustered together. In various implementations, one or more clustering algorithms can be used to cluster the plurality of pedestrians and/or bicyclists, such as, for example, grouping pedestrians which are less than a threshold distance from one another into a cluster.

The caution mode system 185 can then determine whether to enter the caution mode based at least in part on one or more properties of the one or more clusters. For example, if the number of pedestrians or bicyclists in at least one cluster of the one or more clusters is greater than a threshold number, the area of the at least one exceeds a threshold area, and a distance between a hull of the at least one cluster and a planned route of travel of the autonomous vehicle is less than a threshold distance, the caution mode system 185 can determine that the autonomous vehicle 105 should enter into the caution mode and that the one or more limited operational capabilities includes a vehicle speed restriction. An example of a cluster-based determination will be discussed in greater detail with respect to FIG. 3.

In some implementations, the data indicative of the risk of operating the autonomous vehicle 105 in the surrounding environment can include data indicative of a total number of objects perceived by the vehicle autonomy system 130. For example, when the total number of objects perceived by the vehicle autonomy system 130 exceeds a threshold, the caution mode system 185 can determine that the autonomous vehicle should enter into the caution mode.

For example, an autonomous vehicle 105 operating in a parking lot may perceive hundreds of objects, such as pedestrians, other vehicles, bicycles, shopping carts, etc. In such a situation, the total number of objects perceived by the perception system 155 may exceed a threshold (e.g., 100 objects). The caution mode system 185 can receive perception data 170 indicative of the total number of objects perceived by the perception system 155, and in response to determining that the total number of objects exceeds a threshold, determine that the autonomous vehicle should enter into the caution mode with a vehicle speed restriction.

In some implementations, the data indicative of the risk of operating the autonomous vehicle 105 in the surrounding environment can include data indicative of an inability of the vehicle autonomy system 130 to perform one or more functions. For example, the vehicle autonomy system 130 can be configured to perform various functions within a threshold time period (e.g., 100 ms). As examples, each of the sensor data collection, perception, prediction, and motion planning functions can each be consecutively performed, with each function allocated the same amount of time for the analysis to be performed. If, however, any function is unable to be performed within the threshold time period, then the caution mode system 185 can determine that the autonomous vehicle 105 should enter into the caution mode.

For example, as the autonomous vehicle 105 collects sensor data 140 and passes the sensor data 140 to the perception system 155, the perception system 155 can generate perception data 170 associated with each of the objects in the surrounding environment perceived by the autonomous vehicle 105. The perception data 170 can then be provided to the prediction system 160 to generate prediction data 175 associated with each of the objects perceived by the perception system 155. If the prediction system 160 is unable to predict an associated trajectory for each object perceived by the perception system 155 before receiving additional perception data 170 (e.g., perception data generated by subsequently obtained sensor data 140), the caution mode system 185 can determine that the prediction system 160 is not able to perform its function within the threshold time period, and in response, determine that the autonomous vehicle 105 should enter into the caution mode. Similarly, if the perception system 155 is unable to complete its determination of perception data 170 based on sensor data 140 within a threshold time period or the motion planning system 165 is unable to complete its determination of a motion plan 180 based on prediction data 175 within a threshold time period, the caution mode system 185 can determine that the autonomous vehicle 105 should enter into the caution mode.

In some implementations, the data indicative of the risk of operating the autonomous vehicle 105 in the surrounding environment can include data indicative of a discrepancy between two or more subsystems of the vehicle autonomy system 130. For example, in some implementations, the vehicle autonomy system 130 can include two subsystems (e.g., perception systems) which are both configured to perform the same function, such as classifying objects and/or determining state information about objects. For example, in order to provide redundancy and robustness, a first perception system 155 can be configured to generate perception data 170 using a first set of sensor data 140 (e.g., LIDAR data) and a second perception system 155 can be configured to generate perception data 170 using a second set of sensor data 140 (e.g., image data). The two perception systems 155 can be configured to classify objects and/or determine state information about the objects. If, however, there is a discrepancy between the two perception systems 155 that exceeds a threshold, such as a discrepancy (e.g., disagreement) about an object's velocity, then the caution mode system 185 can determine that the autonomous vehicle 105 should enter into the caution mode.

Similarly, in some implementations, two separate systems may have a discrepancy that exceeds a threshold. For example, a prediction system 160 may predict that an object will travel along a particular trajectory, while a perception system 155 may track the object and determine that the object actually traveled in a very different trajectory. In such a situation, the discrepancy between the predicted trajectory and the actual trajectory may exceed a threshold, and the caution mode system 185 can determine that the autonomous vehicle 105 should enter into the caution mode.

In some implementations, the data indicative of the risk of operating the autonomous vehicle 105 in the surrounding environment can include perception data 170 and/or prediction data 175 of one or more objects in the surrounding environment. Further, a machine-learned model can be configured to determine that the autonomous vehicle 105 should enter into the caution mode by analyzing the perception data 170 and/or the prediction data 175.

For example, as the autonomous vehicle travels near a crowd (e.g., a cluster) of pedestrians and/or bicyclists, the autonomous vehicle can obtain sensor data 140 indicative of the pedestrians and/or bicyclists. The machine-learned model can be trained to analyze perception data 170 and/or prediction data 175 obtained from the vehicle autonomy system 130 and determine that the autonomous vehicle 105 should enter into the caution mode.

The machine-learned model can be trained by, for example, using vehicle data logs from previous autonomous driving sessions, which can include sensor data 140, perception data 170, prediction data 175, motion planning data 180, map data 145, and/or other data. In some implementations, the vehicle data logs can be annotated by a human reviewer and/or operator. For example, when the autonomous vehicle 105 is operated by a human operator (e.g., such as in a manual or semi-autonomous mode), the human operator 105 can annotate the vehicle data logs by indicating a reason why the human operator crowd of pedestrians and/or bicyclists. For example, the human operator can press a button in a user interface to indicate the reason why the human operator slowed down. Similarly, a human reviewer can annotate vehicle data logs using after the autonomous driving sessions have been completed. For example, the human reviewer can indicate that the autonomous vehicle 105 should enter into the caution mode in response to the autonomous vehicle 105 travelling near a crowd of pedestrians.

In some implementations, the machine-learned model can be trained to model human operator behavior. For example, when a human operator of an autonomous vehicle 105 operating in a manual mode drives at a speed less than a speed limit, the machine learned model can be trained to recognize that the autonomous vehicle is operating at a limited operational capability (e.g., slower than the speed limit) and further identify reasons therefore. For example, a vehicle stopped on a shoulder may cause a human operator to slow down in order to safely pass the vehicle. Similarly, when a human operator chooses to wait for a green turn signal, such as a protected left turn due to heavy oncoming traffic rather than an unprotected turn or opts to not make a right turn on red due to pedestrians approaching an intersection, the machine-learned model can be trained to identify similar situations and, in response, enter a caution mode in which the autonomous vehicle 105 similarly limits an operational capability.

In some implementations, the caution mode system 185 can control the operation of the autonomous vehicle 105 by publishing one or more limited operational capabilities to the motion planning system 165. For example, the caution mode system 185 can publish a vehicle speed restriction (e.g., a maximum vehicle speed) to the motion planning system 165. The motion planning system 165 can then use the published vehicle speed restriction to plan an appropriate motion plan 180 for the autonomous vehicle 105 subject to the vehicle speed restriction. Similarly, when implementing a motion plan 180, other limited operational capabilities, such as right turn on red restrictions or unprotected left turn restrictions can be implemented by the motion planning system 165 to limit when and where such turns are performed by the autonomous vehicle 180.

Figure 2:
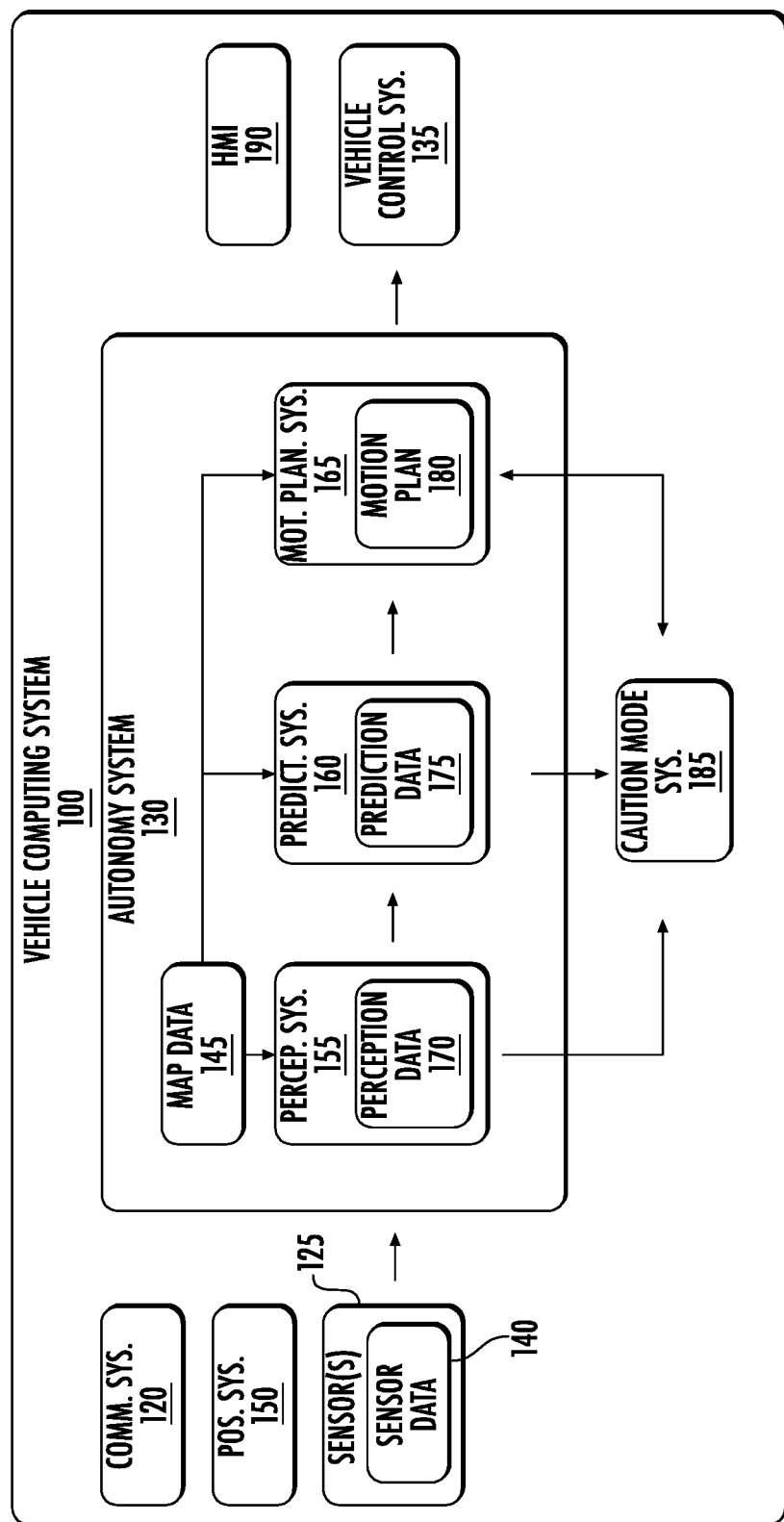
FIG. 2 depicts a block diagram of an example autonomous vehicle computing system according to example aspects of the present disclosure.

FIG. 1 depicts one implementation of a caution mode system 185 in which the caution mode system is incorporated into or otherwise included in a vehicle autonomy system 130. For example, the caution mode system 185 can be implemented as a subsystem of the vehicle autonomy system 185. In other implementations, however, the caution mode system 185 can be separate from the vehicle autonomy system 130. For example, FIG. 2 depicts an alternate vehicle computing system 100 in which the caution mode system 185 is implemented as a system separate from the vehicle autonomy system 130.

The vehicle computing system 100 can cause the autonomous vehicle 105 to initiate a motion control in accordance with at least a portion of the motion plan 180. A motion control can be an operation, action, etc. that is associated with controlling the motion of the vehicle. For instance, the motion plan 180 can be provided to the vehicle control system(s) 135 of the autonomous vehicle 105. The vehicle control system(s) 135 can be associated with a vehicle controller (e.g., including a vehicle interface) that is configured to implement the motion plan 180. The vehicle controller can, for example, translate the motion plan 180 into instructions for the appropriate vehicle control component (e.g., acceleration control, brake control, steering control, etc.). By way of example, the vehicle controller can translate a determined motion plan 180 into instructions to adjust the steering of the autonomous vehicle 105 "X" degrees, apply a certain magnitude of braking force, etc. The vehicle controller (e.g., the vehicle interface) can help facilitate the responsible vehicle control (e.g., braking control system, steering control system, acceleration control system, etc.) to execute the instructions and implement the motion plan 180 (e.g., by sending control signal(s), making the translated plan available, etc.). This can allow the autonomous vehicle 105 to autonomously travel within the vehicle's surrounding environment.

The autonomous vehicle 105 can include an HMI ("Human Machine Interface") 190 that can output data for and accept input from a user 195 of the autonomous vehicle 105. The HMI 190 can include one or more output devices such as display devices, speakers, tactile devices, etc. For instance, the autonomous vehicle 105 can include a plurality of display devices. The display devices can include smart glass technology, a display screen, CRT, LCD, plasma screen, touch screen, TV, projector, other types of display devices and/or a combination thereof. One or more of the display devices can be included in a user device (e.g., personal computer, tablet, mobile phone, etc.).

The plurality of display devices can include a first display device and a second display device. The first display device can be associated with the exterior of the autonomous vehicle 105. The first display device can be located on an exterior surface and/or other structure, of the autonomous vehicle 105 and/or configured such that a user 195 can view and/or interact with the first display device (and/or a user interface rendered thereon) from the exterior of the autonomous vehicle 105. For example, one or more windows of the autonomous vehicle 105 can include smart glass technology that can perform as the first display device. The second display device can be associated with the interior of the autonomous vehicle 105. The second display device can be located on an interior surface and/or other structure (e.g., seat, etc.) of the autonomous vehicle 105 and/or configured such that a user can view and/or interact with the second display device (and/or a user interface rendered thereon) from the interior of the autonomous vehicle 105. For example, a user device (e.g., tablet, etc.) located within the interior of the autonomous vehicle 105 can include the second display device.

The autonomous vehicle 105 can be associated with a variety of different parties. In some implementations, the autonomous vehicle 105 can be associated with a vehicle provider. The vehicle provider can include, for example, an owner, a manufacturer, a vendor, a manager, a coordinator, a handler, etc. of the autonomous vehicle 105. The vehicle provider can be an individual, a group of individuals, an entity (e.g., a company), a group of entities, a service entity, etc. In some implementations, the autonomous vehicle 105 can be included in a fleet of vehicles associated with the vehicle provider. The vehicle provider can utilize a vehicle provider computing system that is remote from the autonomous vehicle 105 to communicate (e.g., over one or more wireless communication channels) with the vehicle computing system 100 of the autonomous vehicle 105. The vehicle provider computing system can include a server system (e.g., of an entity), a user device (e.g., of an individual owner), and/or other types of computing systems.

The autonomous vehicle 105 can be configured to perform vehicle services for one or more service entities. An autonomous vehicle 105 can perform a vehicle service by, for example, travelling (e.g., traveling autonomously) to a location associated with a requested vehicle service, allowing user(s) 195 and/or item(s) to board or otherwise enter the autonomous vehicle 105, transporting the user(s) 195 and/or item(s), allowing the user(s) 195 and/or item(s) to deboard or otherwise exit the autonomous vehicle 105, etc. In this way, the autonomous vehicle 105 can provide the vehicle service(s) for a service entity to a user 195.

A service entity can be associated with the provision of one or more vehicle services. For example, a service entity can be an individual, a group of individuals, a company (e.g., a business entity, organization, etc.), a group of entities (e.g., affiliated companies), and/or another type of entity that offers and/or coordinates the provision of one or more vehicle services to one or more users 195. For example, a service entity can offer vehicle service(s) to users 195 via one or more software applications (e.g., that are downloaded onto a user computing device), via a website, and/or via other types of interfaces that allow a user 195 to request a vehicle service. As described herein, the vehicle services can include transportation services (e.g., by which a vehicle transports user(s) 195 from one location to another), delivery services (e.g., by which a vehicle transports/delivers item(s) to a requested destination location), courier services (e.g., by which a vehicle retrieves item(s) from a requested origin location and transports/delivers the item to a requested destination location), and/or other types of services.

Each service entity can be associated with a respective telecommunications network system of that service entity. A telecommunications network system can include the infrastructure to facilitate communication between the autonomous vehicle 105 and the various computing systems of the associated service entity that are remote from the autonomous vehicle 105. For example, a service entity can utilize an operations computing system 200 to communicate with, coordinate, manage, etc. autonomous vehicle(s) to perform the vehicle services of the service entity. A telecommunications network system can allow an autonomous vehicle 105 to utilize the back-end functionality of the respective operations computing system 200 (e.g., service assignment allocation, vehicle technical support, etc.).

An operations computing system 200 can include one or more computing devices that are remote from the autonomous vehicle 105 (e.g., located off-board the autonomous vehicle 105). For example, such computing device(s) can be components of a cloud-based server system and/or other type of computing system that can communicate with the vehicle computing system 100 of the autonomous vehicle 105, another computing system (e.g., a vehicle provider computing system, etc.), a user device, etc. The operations computing system 200 can be or otherwise included in a data center for the service entity, for example. The operations computing system can be distributed across one or more location(s) and include one or more sub-systems. The computing device(s) of an operations computing system 200 can include various components for performing various operations and functions. For instance, the computing device(s) can include one or more processor(s) and one or more tangible, non-transitory, computer readable media (e.g., memory devices, etc.). The one or more tangible, non-transitory, computer readable media can store instructions that when executed by the one or more processor(s) cause the operations computing system (e.g., the one or more processors, etc.) to perform operations and functions, such as communicating data to and/or obtaining data from vehicle(s), etc.

In some implementations, the operations computing system 200 and the vehicle computing system 100 can indirectly communicate. For example, a vehicle provider computing system can serve as an intermediary between the operations computing system and the vehicle computing system 100 such that at least some data is communicated from the operations computing system 200 (or the vehicle computing system 100) to the vehicle provider computing system and then to the vehicle computing system 100 (or the operations computing system 200).

Figure 3:
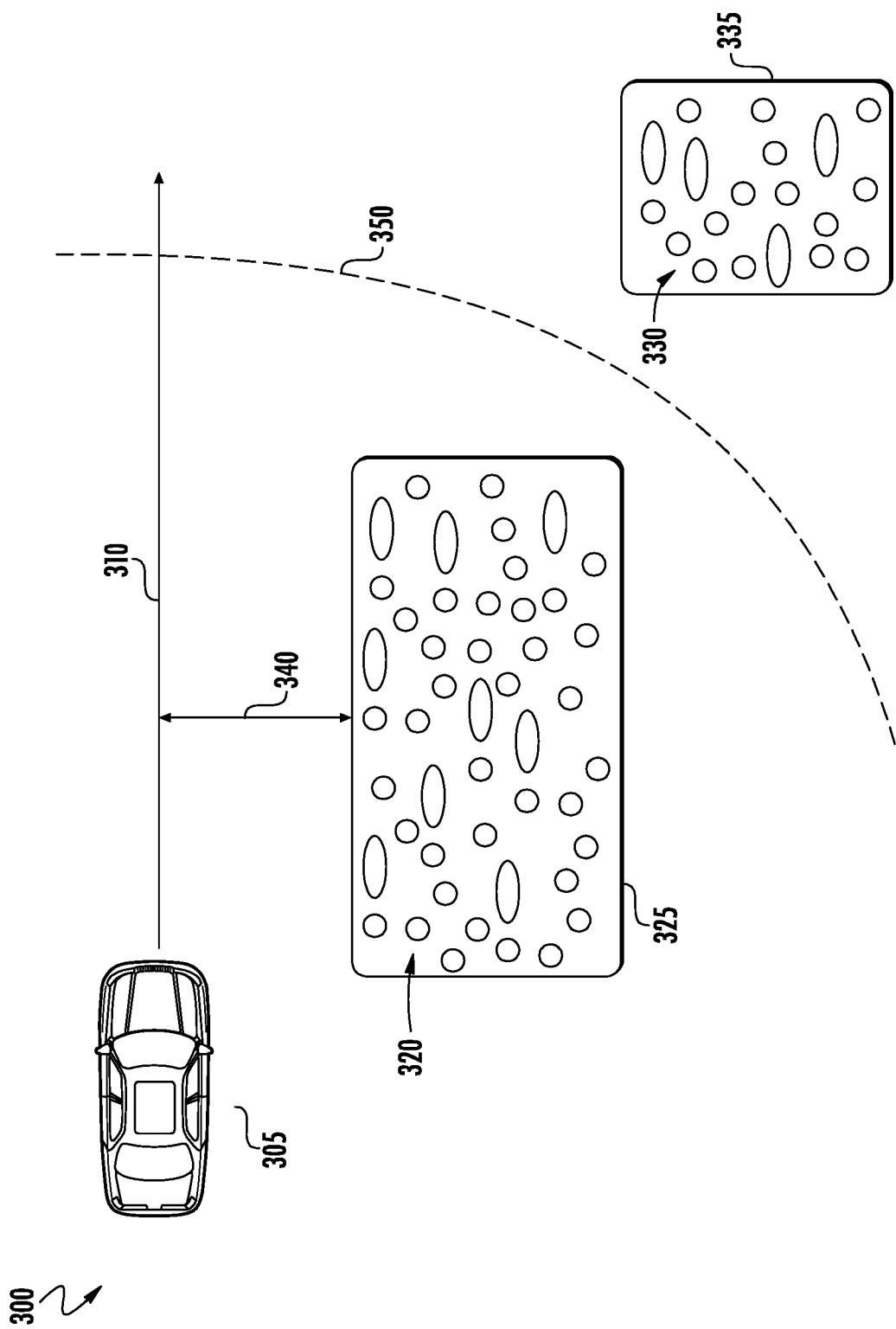
FIG. 3 depicts an example scenario and caution mode analysis according to example aspects of the present disclosure.

Referring now to FIG. 3, an example depiction of a caution mode analysis scenario 300 is shown. As shown, an autonomous vehicle 305 is traveling along a planned route of travel 310 determined by a motion plan. The autonomous vehicle 305 is surrounded by a plurality of objects 320 and 330. The objects 320 and 330 can be, for example, pedestrians, bicycles, vehicles, and/or other objects.

According to example aspects of the present disclosure, the autonomous vehicle 305 can obtain data indicative of the plurality of objects 320 and 330 in the surrounding environment of the autonomous vehicle 305. For example, the autonomous vehicle 305 can obtain sensor data and analyze the sensor data using the vehicle computing system to perceive the plurality of objects 320 and 330.

The autonomous vehicle 305 (e.g., a computing system thereof) can determine one or more clusters of the objects 320 and 330 based at least in part on data indicative of the plurality of objects 320 and 330. For example, objects 320/330 (e.g., pedestrians and/or bicyclists) located in close proximity to one another can be clustered together. In various implementations, one or more clustering algorithms can be used to cluster the plurality of objects 320/330, such as, for example, grouping objects which are less than a threshold distance from one another into a cluster. For example, the objects 320 can be grouped into a first cluster, and the objects 330 can be grouped into a second cluster.

The autonomous vehicle 305 (e.g., a computing system thereof) can determine a hull 325/335 around each cluster. For example, the hulls 325/335 can generally define an exterior boundary of each respective cluster. The hulls 325/335 can be, for example, convex and/or concave boundaries. The hulls 325/335 can be determined by, for example, determining a polygon or other shape around the plurality of objects 320/330 within a cluster. In some implementations, the hulls 325/335 can be determined concurrently with determining the clusters of objects 320/330. In some implementations, the hulls 325/335 can be considered a property of a respective cluster of objects 320/330.

According to example aspects of the present disclosure, the autonomous vehicle 305 can determine whether to enter an operation mode having one or more limited operational capabilities (e.g., a caution mode) based at least in part on one or more properties of the one or more clusters. For example, in some implementations, the autonomous vehicle 305 can determine whether a number of objects (e.g., pedestrians and/or bicyclists) in at least one of the one or more clusters is greater than a threshold number. For example, clusters of objects which are greater than the threshold number can be considered for additional analysis, while clusters of objects 320/330 that are less than the threshold number are not.

In some implementations, the autonomous vehicle 305 can determine whether an area of a cluster is greater than a threshold area. For example, clusters of objects 320/330 which have a total area greater than a threshold area can be considered for additional analysis, while clusters of objects 320/330 that are less than the threshold area or not. For example, the autonomous vehicle 305 can determine the area of each cluster of object 320/330 by, for example, calculating the total area encompassed by the respective hull 325/335 of each cluster of objects 320/330.

In some implementations, the autonomous vehicle 305 can determine whether a distance between the hull 325/335 of a cluster of objects 320/330 and the planned route of travel 310 is less than a threshold distance. For example, as shown, a distance 340 between the hull 325 of the cluster of objects 320 and the planned route of travel 310 is shown in FIG. 3. The autonomous vehicle 305 can determine the distance 340 by, for example, determining the closest point along the planned route of travel 310 to the hull 325 of the cluster of objects 320.

In some implementations, when the distance 340 between the hull 325 of a cluster of objects 320 and the planned route of travel 310 is less than a threshold distance, the autonomous vehicle 305 can enter into an operational mode having one or more limited operational capabilities. For example, in some implementations, the one or more limited operational capabilities can include a vehicle speed restriction. The vehicle speed restriction can be, for example, a reduced maximum vehicle speed.

For example, during normal operation, a maximum vehicle speed for an autonomous vehicle 305 may be 25 miles per hour (e.g., such as a speed limit set by a municipality). The vehicle speed restriction may be, for example a reduced maximum vehicle speed which is lower than the maximum vehicle speed for normal operation. For example, the vehicle speed restriction may be 10 miles per hour.

In response to determining that the distance 340 between the hull 325 of the cluster of objects 320 and the planned route of travel 310 is less than a threshold distance, the autonomous vehicle can enter into the limited operation mode subject to the vehicle speed restriction, and can control the autonomous vehicle 305 to a vehicle speed at or below the vehicle speed restriction.

In some implementations, the autonomous vehicle 305 can be controlled to a vehicle speed at or below the vehicle speed restriction subject to a jerk-limited deceleration rate. For example, attempting to control the autonomous vehicle 305 to a vehicle speed at or below the vehicle speed restriction too quickly may cause passenger discomfort. To prevent such discomfort, the caution mode system of the autonomous vehicle 305 can publish a vehicle speed restriction to the motion planning system, which can then implement a motion plan with a vehicle speed at or below the vehicle speed restriction over a sufficient period of time to allow for the autonomous vehicle 305 to decelerate at a rate at or below the jerk-limited deceleration rate. Thus, in some implementations, controlling the autonomous vehicle 305 to the vehicle speed at or below the vehicle speed restriction can include controlling the autonomous vehicle 305 subject to a jerk-limited deceleration rate.

In some implementations, once the autonomous vehicle 305 has entered into the caution mode, the autonomous vehicle 305 (e.g., the computing system thereof) can determine whether one or more of the plurality of objects 320/330 in the surrounding environment of the autonomous vehicle 305 are positioned at a distance greater than a threshold distance from the autonomous vehicle 305. Further, for each object that is positioned at a distance greater than the threshold distance, the autonomous vehicle 305 can prune the respective object from a set of objects to be analyzed by one or more subsystems.

For example, as depicted in FIG. 3, plurality of objects 320 in the first cluster are all closer to the autonomous vehicle 305 than the distance indicated by dashed line 350. However, the plurality of objects 330 in the second cluster are positioned at a distance greater than the distance indicated by the dashed line 350. According to example aspects of the present disclosure, once the autonomous vehicle 305 has entered into the caution mode, the autonomous vehicle 305 can prune each object greater than the threshold distance (e.g., the objects in the plurality of objects 330 in the second cluster) from a set of objects 320/330 to be analyzed by the computing system of the autonomous vehicle 305 over one or more motion planning iterations. For example, the threshold distance indicated by the dashed line 350 can be determined based on the vehicle speed of the autonomous vehicle 305 to allow for objects 320/330 which will not have an impact on the motion planning system over a period of time (e.g., several motion planning iterations) to be pruned from the set of objects analyzed by the computing system, such as by the prediction and motion planning systems. Thus, by operating the autonomous vehicle 305 at a reduced speed, the number of objects included in a motion planning analysis can be reduced, thereby allowing for reduced computational resources to be used. Further, as the autonomous vehicle 305 progresses along the planned route of travel 310, subsequent determinations of which objects 320/330 are less than the threshold distance from the autonomous vehicle 305 can be performed to allow for then-nearby objects to be included in the motion planning analysis.

In some implementations, once the autonomous vehicle 305 has traveled past a nearby cluster of objects by a threshold distance, the autonomous vehicle 305 can remove the vehicle speed restriction. For example, as the autonomous vehicle 305 travels along the planned route of travel 310, the autonomous vehicle 305 will travel past the plurality of objects 320 in the first cluster. Once the autonomous vehicle 305 has traveled past the plurality of objects 320 in the first cluster by a threshold distance, the caution mode system can remove the previously imposed vehicle speed restriction. For example, once the vehicle speed restriction has been removed, the autonomous vehicle 305 can accelerate to an increased maximum vehicle speed (e.g., from 10 mph to 25 mph). In some implementations, the autonomous vehicle 305 can be controlled to the increased maximum vehicle speed subject to a jerk-limited acceleration rate.

While the example scenario 300 depicted in FIG. 3 depicts a cluster-based analysis to implement a vehicle speed restriction, other types of limited operational capabilities and analysis modes can be implemented, as described herein. For example, a caution mode system can use a similar analysis to implement a right turn on red restriction or an unprotected left turn restriction. Similarly, an object-count threshold analysis, a vehicle autonomy system function analysis, a subsystem discrepancy analysis, or a machine-learned model analysis can be implemented by a caution mode system to implement one or more limited operational capabilities of an autonomous vehicle 305.

Figure 4A:
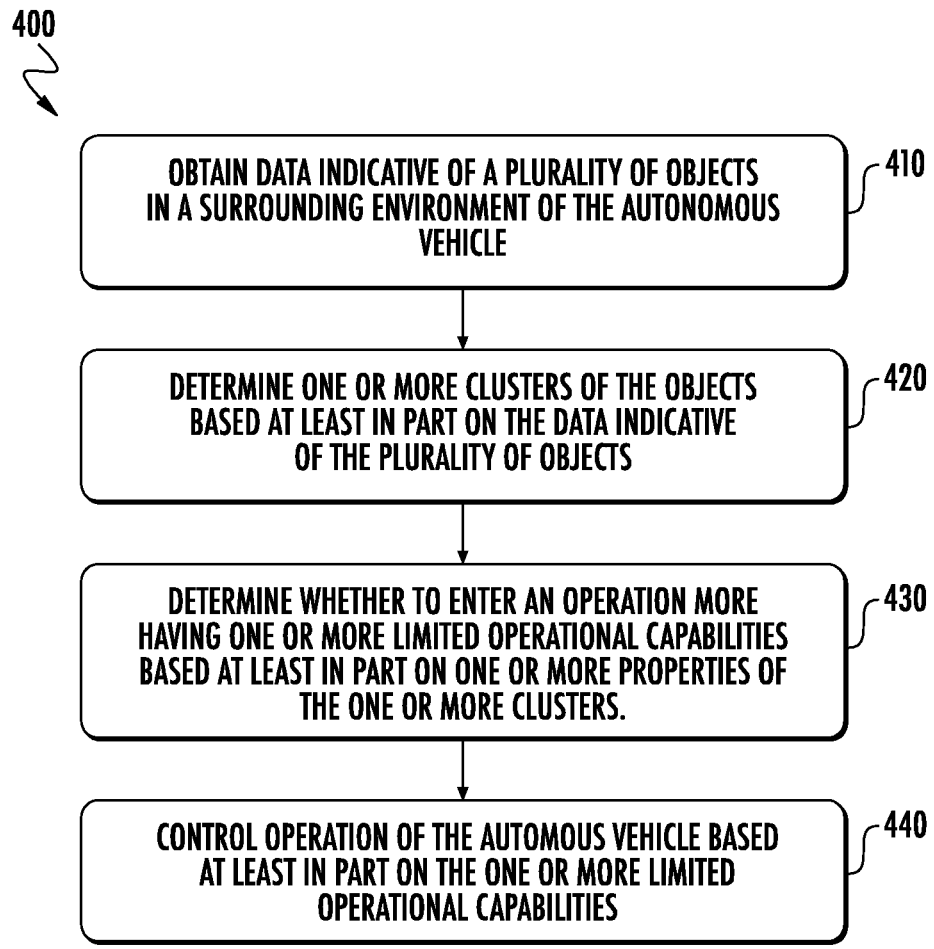
FIG. 4A depicts an example method according to example aspects of the present disclosure.

FIG. 4A depicts a flow diagram of an example method 400 for controlling an autonomous vehicle according to example aspects of the present disclosure. One or more portion(s) of the method 400 can be implemented by a computing system that includes one or more computing devices such as, for example, the computing systems described with reference to the other figures (e.g., a vehicle computing system 100, etc.). Each respective portion of the method 400 can be performed by any (or any combination) of one or more computing devices. Moreover, one or more portion(s) of the method 400 can be implemented as an algorithm on the hardware components of the device(s) described herein (e.g., as in FIGS. 1, 2, 3, and/or 6), for example, to control an autonomous vehicle. FIG. 4A depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 4A is described with reference to elements/terms described with respect to other systems and figures for example illustrated purposes and is not meant to be limiting. One or more portions of method 400 can be performed additionally, or alternatively, by other systems.

At 410, the method 400 can include obtaining data indicative of a plurality of objects in a surrounding environment of an autonomous vehicle. For example, in some implementations, the plurality of objects can include a plurality of pedestrians, bicycles, vehicles, and/or other objects.

At 420, the method 400 can include determining one or more clusters of the objects based at least in part on the data indicative of the plurality of objects. For example, in some implementations, a distance between nearby objects can be used to cluster objects together. Other clustering techniques and/or algorithms can similarly be used, such as clustering objects moving in the same direction, clustering objects of the same type, and/or clustering objects moving at similar velocities.

At 430, the method 400 can include determining whether to enter an operation mode having one or more limited operational capabilities based at least in part on one or more properties of the one or more clusters. For example, in various implementations, the number of objects in a cluster, the area of the cluster, the distance of the cluster from a planned route of travel, and/or other properties can be used to determine whether to enter the operation mode.

At 440, in response to determining that the operation mode having the one or more limited operational capabilities is to be entered by the autonomous vehicle, the method 400 can include controlling operation of the autonomous vehicle based at least in part on the one or more limited operational capabilities. For example, the one or more limited operational capabilities can include one or more of a vehicle speed restriction, a right turn on red restriction, and/or an unprotected left turn restriction.

Figure 4B:
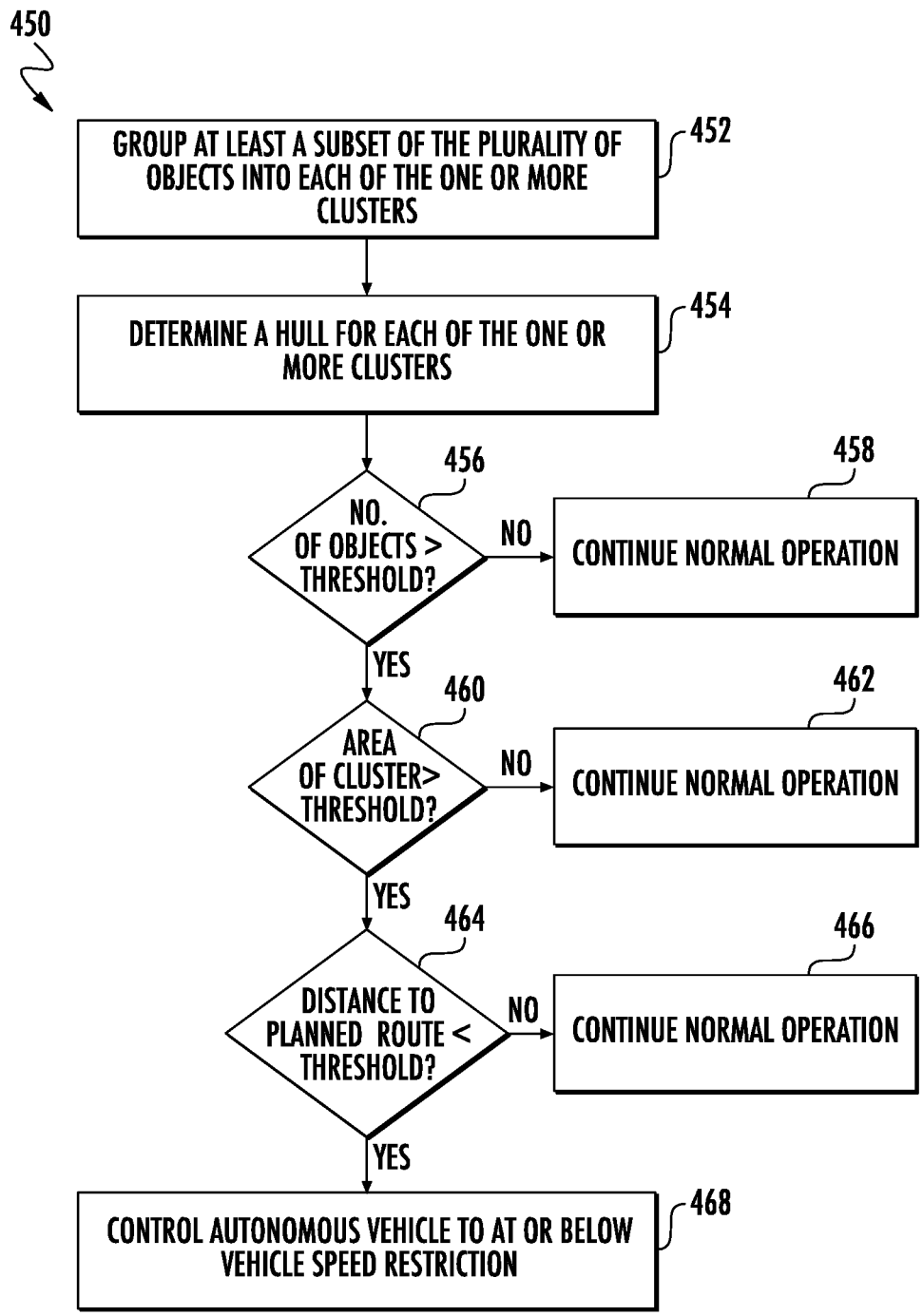
FIG. 4B depicts an example method according to example aspects of the present disclosure.

FIG. 4B depicts a flow diagram of an example method 450 for controlling an autonomous vehicle according to example aspects of the present disclosure. One or more portion(s) of the method 450 can be implemented by a computing system that includes one or more computing devices such as, for example, the computing systems described with reference to the other figures (e.g., a vehicle computing system 100, etc.). Each respective portion of the method 450 can be performed by any (or any combination) of one or more computing devices. Moreover, one or more portion(s) of the method 450 can be implemented as an algorithm on the hardware components of the device(s) described herein (e.g., as in FIGS. 1, 2, 3, and/or 6), for example, to control an autonomous vehicle. FIG. 4B depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 4B is described with reference to elements/terms described with respect to other systems and figures for example illustrated purposes and is not meant to be limiting. One or more portions of method 450 can be performed additionally, or alternatively, by other systems. In some implementations, one or more portions of a method 450 can be performed as a portion of an analysis of whether to enter an operation mode having one or more limited operational capabilities as described with respect to method 400.

At 452, the method 450 can include grouping at least a subset of the plurality of objects into each of one or more clusters. For example, objects in a surrounding environment of an autonomous vehicle can be grouped into one or more clusters, as described herein.

At 454, the method 450 can include determining a hull for each of the one or more clusters. For example, the hull for each cluster can be essentially an outer boundary, such as a polygon encompassing the cluster of objects.

At 456, the method 450 can include determining whether a number of objects in a cluster exceeds a threshold. If not, at 458, normal operation of an autonomous vehicle can be continued.

If, at 456, the number of objects does exceed the threshold, then at 460, the method 450 can include determining whether an area of the cluster is greater than a threshold. If not, at 462, normal operation of the autonomous vehicle can be continued.

If, at 460, the area of the cluster is greater than the threshold, then at 464, the method 450 can include determining whether a distance to the planned route of travel for an autonomous vehicle is less than a threshold. If not, then at 466, normal operation of the autonomous vehicle can be continued.

If, at 464, the distance to the planned route of travel of the autonomous vehicle is less than the threshold, then at 468, the autonomous vehicle can be controlled to at or below a vehicle speed restriction. In some implementations, the autonomous vehicle can be controlled to at or below the vehicle speed restriction subject to a jerk-limited deceleration rate.

Figure 5:
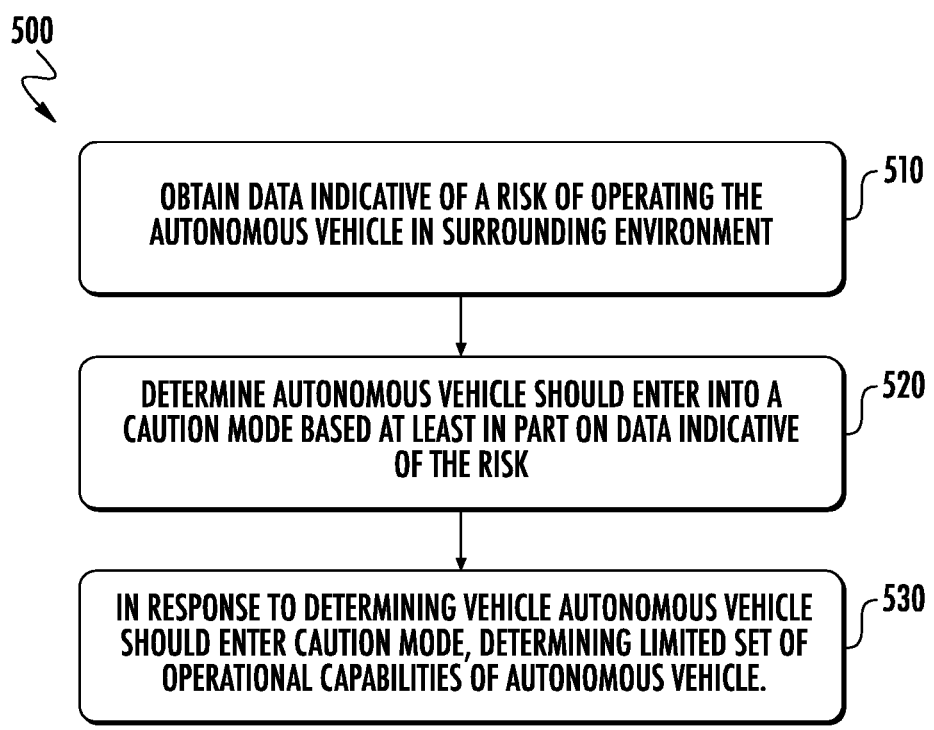
FIG. 5 depicts an example method according to example aspects of the present disclosure.

FIG. 5 depicts a flow diagram of an example method 500 for controlling an autonomous vehicle according to example aspects of the present disclosure. One or more portion(s) of the method 500 can be implemented by a computing system that includes one or more computing devices such as, for example, the computing systems described with reference to the other figures (e.g., a vehicle computing system 100, etc.). Each respective portion of the method 500 can be performed by any (or any combination) of one or more computing devices. Moreover, one or more portion(s) of the method 500 can be implemented as an algorithm on the hardware components of the device(s) described herein (e.g., as in FIGS. 1, 2, 3, and/or 6), for example, to control an autonomous vehicle. FIG. 5 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 5 is described with reference to elements/terms described with respect to other systems and figures for example illustrated purposes and is not meant to be limiting. One or more portions of method 500 can be performed additionally, or alternatively, by other systems.

At 510, the method 500 can include obtaining data indicative of a risk of operating the autonomous vehicle in a surrounding environment. In some implementations, the data indicative of the risk can include data indicative of a cluster of pedestrians or bicyclists. In some implementations, the data indicative of the risk can include data indicative of a total number of objects perceived by the vehicle autonomy system. In some implementations, the data indicative of the risk can include data indicative of the vehicle autonomy system's ability to perform one or more functions. In some implementations, the data indicative of the risk can include data indicative of a discrepancy between two or more subsystems of a vehicle autonomy system. In some implementations, the data indicative of the risk can include perception data and/or prediction data associated with one or more objects in the surrounding environment.

At 520, the method 500 can include determining that the autonomous vehicle should enter into a caution mode based at least in part on the data indicative of the risk. For example, in some implementations, data indicative of a cluster of pedestrians can be used to determine that the autonomous vehicle should enter into the caution mode. For example, when a total number of pedestrians exceeds a threshold number, when an area of the cluster exceeds a threshold area, and when a distance between a hull of the cluster and a planned route of travel is less than a threshold distance, the computing system can determine that the autonomous vehicle should enter the caution mode.

In some implementations, the computing system can determine that the autonomous vehicle should enter into the caution mode by determining that a total number of objects perceived by the vehicle autonomy system exceeds a threshold. For example, a total object count can be compared to a threshold, and when the total number of objects perceived by the autonomous vehicle exceeds the threshold, the computing system can determine that the autonomous vehicle should enter into the caution mode.

In some implementations, determining that the autonomous vehicle should enter into the caution mode can include determining that the vehicle autonomy system is unable to perform at least one of the one or more functions within a threshold time period. For example, if a prediction system is unable to analyze a set of perception data within a threshold time period, the computing system can determine that the autonomous vehicle should enter into the caution mode.

In some implementations, determining that the autonomous vehicle should enter into the caution mode can include determining that a discrepancy between two or more subsystems of the vehicle autonomy system exceeds a threshold. For example, a first perception system and a second perception system may have a discrepancy regarding an object perceived by the autonomous vehicle, which can be used to determine that the autonomous vehicle should enter into the caution mode.

In some implementations, determining that the autonomous vehicle should enter into the caution mode can include determining that the autonomous vehicle should enter into the caution mode by analyzing perception data and/or prediction data using a machine-learned model. For example, the machine-learned model can be trained using annotated driving logs from one or more autonomous driving sessions.

At 530, in response to determining that the vehicle should enter into the caution mode, the method 500 can include determining a limited set of operational capabilities of the autonomous vehicle. The limited set of operational capabilities can include, for example, a vehicle speed restriction, or an unprotected left turn restriction, and/or a right turn on red restriction.

In some implementations, the method 500 can further include obtaining data indicative of a reduced risk of operating the autonomous vehicle in the surrounding environment; determining, based at least in part on the data indicative of the reduced risk of operating the autonomous vehicle in the surrounding environment, that the autonomous vehicle should exit the caution mode; and in response, removing the limited set of operational capabilities of the autonomous vehicle. For example, the data indicative of the reduced risk can include data indicative that the autonomous vehicle has travelled past cluster by a threshold distance, data indicative of a total number of objects less than a threshold in a surrounding environment, data indicative the ability of the vehicle autonomy system to perform one or more functions within a threshold time period, data indicative of an agreement between two or more subsystems of a vehicle autonomy system, and/or perception data and/or prediction data analyzed by a machine-learned model.

Figure 6:
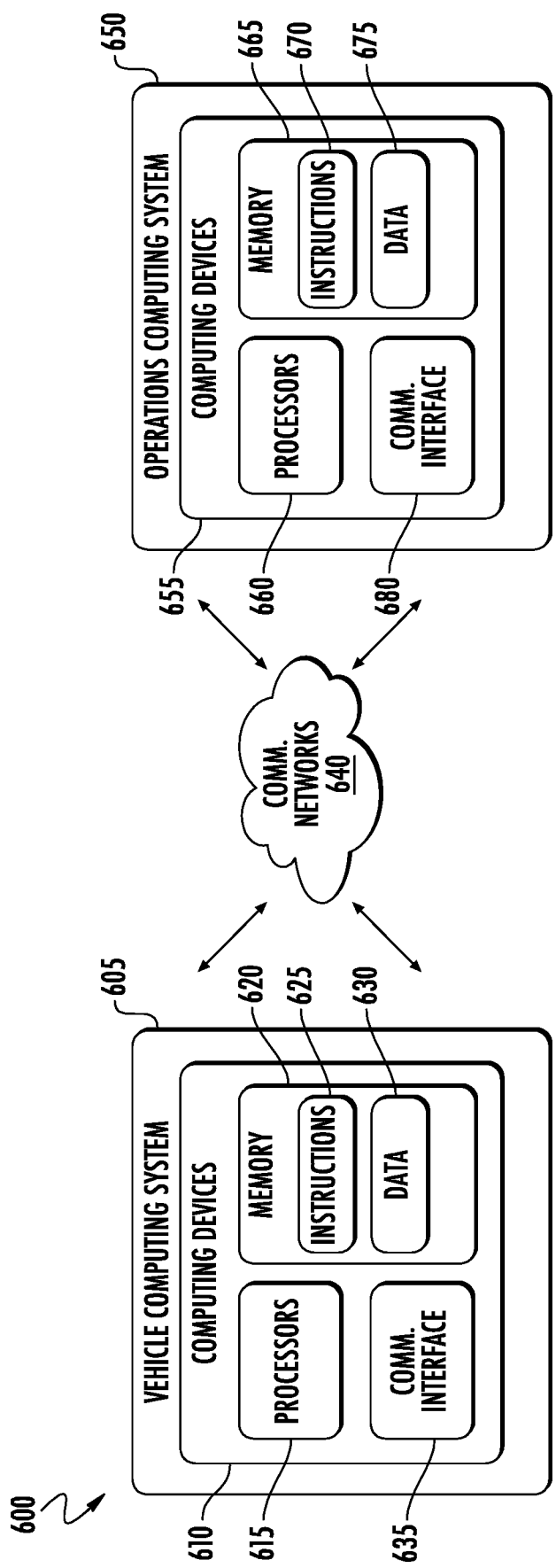
FIG. 6 depicts example system components according to example aspects of the present disclosure.

FIG. 6 depicts an example system 600 according to example aspects of the present disclosure. The example system 600 illustrated in FIG. 6 is provided as an example only. The components, systems, connections, and/or other aspects illustrated in FIG. 6 are optional and are provided as examples of what is possible, but not required, to implement the present disclosure. The example system 600 can include a vehicle computing system 605 of a vehicle. The vehicle computing system 605 can represent/correspond to the vehicle computing system 100 described herein. The example system 600 can include a remote computing system 650 (e.g., that is remote from the vehicle computing system). The remote computing system 650 can represent/correspond to an operations computing system 200 described herein. The vehicle computing system 605 and the remote computing system 650 can be communicatively coupled to one another over one or more network(s) 640.

The computing device(s) 610 of the vehicle computing system 605 can include processor(s) 615 and a memory 620. The one or more processors 615 can be any suitable processing device (e.g., a processor core, a microprocessor, an ASIC, a FPGA, a controller, a microcontroller, etc.) and can be one processor or a plurality of processors that are operatively connected. The memory 620 can include one or more non-transitory computer-readable storage media, such as RAM, ROM, EEPROM, EPROM, one or more memory devices, flash memory devices, data registrar, etc., and combinations thereof.

The memory 620 can store information that can be accessed by the one or more processors 615. For instance, the memory 620 (e.g., one or more non-transitory computer-readable storage mediums, memory devices) on-board the vehicle can include computer-readable instructions 625 that can be executed by the one or more processors 615. The instructions 625 can be software written in any suitable programming language or can be implemented in hardware. Additionally, or alternatively, the instructions 625 can be executed in logically and/or virtually separate threads on processor(s) 615.

For example, the memory 620 can store instructions 625 that when executed by the one or more processors 615 cause the one or more processors 615 (the vehicle computing system 605) to perform operations such as any of the operations and functions of the vehicle computing system 100 (or for which it is configured), one or more of the operations and functions of the vehicle provider computing systems (or for which it is configured), one or more of the operations and functions of the operations computing systems described herein (or for which it is configured), one or more of the operations and functions for controlling an autonomous vehicle, one or more portions of method(s) 400/450/500, and/or one or more of the other operations and functions of the computing systems described herein.

The memory 620 can store data 630 that can be obtained (e.g., acquired, received, retrieved, accessed, created, stored, etc.). The data 630 can include, for instance, sensor data, map data, vehicle state data, perception data, prediction data, motion planning data, data associated with a vehicle client, data associated with a service entity's telecommunications network, data associated with an API, data associated with a library, state data indicative of a state of an object, data associated with user interfaces, data associated with user input, and/or other data/information such as, for example, that described herein. In some implementations, the computing device(s) 610 can obtain data from one or more memories that are remote from the vehicle computing system 605.

The computing device(s) 610 can also include a communication interface 635 used to communicate with one or more other system(s) on-board a vehicle and/or a remote computing device that is remote from the vehicle (e.g., of the system 650). The communication interface 635 can include any circuits, components, software, etc. for communicating via one or more networks (e.g., network(s) 640). The communication interface 635 can include, for example, one or more of a communications controller, receiver, transceiver, transmitter, port, conductors, software and/or hardware for communicating data.

The remote computing system 650 can include one or more computing device(s) 655 that are remote from the vehicle computing system 605. The computing device(s) 655 can include one or more processors 660 and a memory 665. The one or more processors 660 can be any suitable processing device (e.g., a processor core, a microprocessor, an ASIC, a FPGA, a controller, a microcontroller, etc.) and can be one processor or a plurality of processors that are operatively connected. The memory 665 can include one or more tangible, non-transitory computer-readable storage media, such as RAM, ROM, EEPROM, EPROM, one or more memory devices, flash memory devices, data registrar, etc., and combinations thereof.

The memory 665 can store information that can be accessed by the one or more processors 660. For instance, the memory 665 (e.g., one or more tangible, non-transitory computer-readable storage media, one or more memory devices, etc.) can include computer-readable instructions 670 that can be executed by the one or more processors 660. The instructions 670 can be software written in any suitable programming language or can be implemented in hardware. Additionally, or alternatively, the instructions 670 can be executed in logically and/or virtually separate threads on processor(s) 660.

For example, the memory 665 can store instructions 670 that when executed by the one or more processors 660 cause the one or more processors 660 to perform operations such as any of the operations and functions of the operations computing systems described herein, any operations and functions of the vehicle provider computing systems, any of the operations and functions for which the operations computing systems and/or the vehicle computing systems are configured, one or more of the operations and functions of the vehicle computing system described herein, one or more of the operations and functions for controlling an autonomous vehicle, one or more portions of method 400/450/500, and/or one or more of the other operations and functions described herein.

The memory 665 can store data 675 that can be obtained. The data 675 can include, for instance, sensor data, map data, vehicle state data, perception data, prediction data, motion planning data, data associated with a vehicle client, data associated with a service entity's telecommunications network, data associated with an API, data associated with a library, state data indicative of a state of an object, data associated with user interfaces, data associated with user input, and/or other data/information such as, for example, that described herein.

The computing device(s) 655 can also include a communication interface 680 used to communicate with one or more system(s) onboard a vehicle and/or another computing device that is remote from the system 650. The communication interface 680 can include any circuits, components, software, etc. for communicating via one or more networks (e.g., network(s) 640). The communication interface 680 can include, for example, one or more of a communications controller, receiver, transceiver, transmitter, port, conductors, software and/or hardware for communicating data.

The network(s) 640 can be any type of network or combination of networks that allows for communication between devices. In some embodiments, the network(s) 640 can include one or more of a local area network, wide area network, the Internet, secure network, cellular network, mesh network, peer-to-peer communication link and/or some combination thereof and can include any number of wired or wireless links. Communication over the network(s) 640 can be accomplished, for instance, via a communication interface using any type of protocol, protection scheme, encoding, format, packaging, etc.

Computing tasks, operations, and functions discussed herein as being performed at one computing system herein can instead be performed by another computing system, and/or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

The communications between computing systems described herein can occur directly between the systems or indirectly between the systems. For example, in some implementations, the computing systems can communicate via one or more intermediary computing systems. The intermediary computing systems may alter the communicated data in some manner before communicating it to another computing system.

The number and configuration of elements shown in the figures is not meant to be limiting. More or less of those elements and/or different configurations can be utilized in various embodiments.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method to control operation of an autonomous vehicle, comprising:
   (a) obtaining data indicative of a plurality of objects in a surrounding environment of the autonomous vehicle;
   (b) determining one or more clusters of the plurality of objects based on the data indicative of the plurality of objects;
   (c) determining that an area of at least one of the one or more clusters is greater than a threshold area;
   (d) entering an operation mode having one or more limited operational capabilities in response to determining that the area of at least one of the one or more clusters is greater than the threshold area; and
   (e) controlling operation of the autonomous vehicle based at least in part on the one or more limited operational capabilities of the operation mode.

2. The method of claim 1, further comprising entering the operation mode having the one or more limited operational capabilities based at least in part on an ability associated with an autonomy system of the autonomous vehicle.

3. The method of claim 2, wherein the threshold area is based on the ability associated with the autonomy system of the autonomous vehicle.

4. The method of claim 1, wherein the area of at least one of the one or more clusters is determined based on a hull of the at least one of the one or more clusters.

5. The method of claim 4, wherein the area of at least one of the one or more clusters comprises a total area encompassed by respective hulls of the at least one of the one or more clusters.

6. The method of claim 1, wherein (d) comprises:
   (i) determining a total quantity of objects in the at least one of the one or more clusters;
   (ii) determining that the total quantity of objects in the at least one of the one or more clusters exceeds a threshold quantity of objects; and
   (iii) entering an operation mode having one or more limited operational capabilities in response to determining that the area of at least one of the one or more clusters is greater than the threshold area and determining that the total quantity of objects in the at least one of the one or more clusters exceeds a threshold quantity of objects.

7. The method of claim 1, wherein determining the one or more clusters of the plurality of objects comprises grouping one or more objects of the plurality of objects that are less than a threshold distance from one another into a respective cluster of the one or more clusters.

8. The method of claim 1, wherein the plurality of objects comprises a plurality of pedestrians or bicyclists.

9. The method of claim 1, wherein the one or more limited operational capabilities comprise a vehicle speed restriction.

10. The method of claim 9, wherein the method further comprises:
    (f) determining a distance between one or more objects of the plurality of objects and the autonomous vehicle; and
    (g) determining the vehicle speed restriction based on the distance.

11. The method of claim 10, wherein the threshold area is based on the distance between one or more objects of the plurality of objects and the autonomous vehicle.

12. The method of claim 1, wherein the surrounding environment comprises an intersection and the one or more limited operational capabilities comprise a right turn on red restriction.

13. The method of claim 1, wherein the surrounding environment comprises an intersection and the one or more limited operational capabilities comprise an unprotected left turn restriction.

14. A computing system comprising:
    one or more processors; and
    one or more tangible, non-transitory, computer-readable media that store instructions for execution by the one or more processors to cause the computing system to perform operations, the operations comprising:
    (a) obtaining data indicative of a plurality of objects in a surrounding environment of an autonomous vehicle;
    (b) determining one or more clusters of the plurality of objects based on the data indicative of the plurality of objects;
    (c) determining that an area of at least one of the one or more clusters is greater than a threshold area;
    (d) entering an operation mode having one or more limited operational capabilities in response to determining that the area of at least one of the one or more clusters is greater than the threshold area; and (e) controlling the operation of the autonomous vehicle based at least in part on the one or more limited operational capabilities of the operation mode.

15. The computing system of claim 14, wherein the operations further comprise entering the operation mode having the one or more limited operational capabilities based at least in part on an ability associated with an autonomy system of the autonomous vehicle.

16. The computing system of claim 15, wherein the threshold area is based on the ability associated with an autonomy system of the autonomous vehicle.

17. The computing system of claim 14, wherein the area of at least one of the one or more clusters is determined based on a hull of the at least one of the one or more clusters.

18. The computing system of claim 17, wherein the area of at least one of the one or more clusters comprises a total area encompassed by respective hulls of the at least one of the one or more clusters.

19. The computing system of claim 14, wherein determining the one or more clusters of the plurality of objects comprises grouping one or more objects of the plurality of objects that are less than a threshold distance from one another into a respective cluster of the one or more clusters.

20. One or more tangible, non-transitory, computer-readable media storing instructions that are executable by one or more processors to cause the one or more processors to perform operations, the operations comprising:
(a) obtaining data indicative of a plurality of objects in a surrounding environment of the autonomous vehicle;
(b) determining one or more clusters of the plurality of objects based on the data indicative of the plurality of objects;
(c) determining that an area of at least one of the one or more clusters is greater than a threshold area;
(d) entering an operation mode having one or more limited operational capabilities in response to determining that the area of at least one of the one or more clusters is greater than the threshold area; and
(e) controlling the operation of the autonomous vehicle based at least in part on the one or more limited operational capabilities of the operation mode.

* * * * *